US007234076B2

United States Patent
Daynes et al.

(10) Patent No.: US 7,234,076 B2
(45) Date of Patent: Jun. 19, 2007

(54) MULTI-LEVEL UNDO OF MAIN-MEMORY AND VOLATILE RESOURCES

(75) Inventors: Laurent P. Daynes, Sunnyvale, CA (US); Grzegorz J. Czajkowski, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 888 days.

(21) Appl. No.: 10/366,851

(22) Filed: Feb. 14, 2003

(65) Prior Publication Data

US 2003/0208500 A1 Nov. 6, 2003

Related U.S. Application Data

(60) Provisional application No. 60/357,191, filed on Feb. 15, 2002.

(51) Int. Cl.
*G06F 11/00* (2006.01)
(52) U.S. Cl. ..................................................... 714/15
(58) Field of Classification Search .................. 714/20, 714/14, 15
See application file for complete search history.

(56) References Cited

U.S. PATENT DOCUMENTS

| 5,983,225 A | 11/1999 | Anfindsen |
| 6,044,370 A | 3/2000 | Anfindsen |
| 6,182,186 B1 * | 1/2001 | Daynes ...................... 710/200 |
| 6,343,339 B1 | 1/2002 | Daynes |
| 2003/0105756 A1 | 6/2003 | Daynes |
| 2004/0098425 A1 * | 5/2004 | Wiss et al. .................. 707/204 |

OTHER PUBLICATIONS

Laurent Daynès & G. Czajkowski., "Lightweight Flexible Isolation for Language-based Extensible Systems," Proceedings of the 28th VLDB Conference, Hong Kong, China, 2002, Published Aug. 20, 2002, 12 pages.
Barbara Liskov et al., "Implementation of Argus", *Proceedings of 11th International Symposium on Operating System Principle* (SOSP), 1987, pp. 111-122.

(Continued)

*Primary Examiner*—Bryce P. Bonzo
(74) *Attorney, Agent, or Firm*—Osha Liang LLP

(57) ABSTRACT

System resources (e.g., objects or other resources) are managed to provide multiple levels of undo and/or support for delegation of updates on main-memory resident objects accessible by concurrent transactions. For example, a log associated with each transaction stores information regarding an update to an object when the object is locked in an update mode (e.g., a write mode) by the transaction. The transaction can be rolled back by restoring information from the log of the transaction to the object. If the transaction commits, then the log may be destroyed. If the transaction delegates to another transaction, the log of the transaction is also delegated. A record codelet can be automatically generated to perform the storing of information in the log, and a restore codelet can be automatically generated to undo updates by restoring information from the log to the updated objects. The codelets may be specific to each class of objects. Lock state information is used to identify undo information age so that the undo information may be stored in the log without regard to order, thereby enhancing the speed of the recording process.

47 Claims, 9 Drawing Sheets

OTHER PUBLICATIONS

J.L. Eppinger et al., "Camelot and Avalon: A Distributed Transaction Facility", Morgan Kaufmann Publishers, San Mateo, California, 1991, pp. 3-11, 81-92, 121-162 and 251-286.

Laurent Daynès et al., "Locking in OODBMS Client Supporting Nested Transactions", *IEEE 11th International Conference on Data Engineering*, France, 1995, pp. 316-323.

Ole Anfindsen, "Apotram—An Application-Oriented Transaction Model", PhD Thesis, University of Oslo, Dept. of Informatics, Oslo, Norway, 1997, pp. ii-124.

Roger S. Barga & Calton Pu, "A Reflective Framework for Implementing Extended Transactions", *Advanced Transaction Models and Architectures*, Data Management Systems, Chapter 3, Kluwer Academic Publishers, Boston, 1997, pp. 63-89.

Laurent Daynès & Olivier Gruber, "Customizing Concurrency Control Using Graph of Locking Capabilities", *Sixth International Workshop on Persistent Object Systems*, France, Sep. 1994, Springer-Verlag, pp. 147-161.

Laurent Daynès & G. Czajkowski, "High Performance, Space-Efficient, Automated Object Locking," *IEEE 14th International Conference on Data Engineering*, Heidleberg, Germany, Apr. 2, 2001-Apr. 6, 2001, 10 pages.

A. Biliris et al, "Asset: A System Supporting Extended Transaction," in *Proc. of ACM SIGMOD Int'l Conf. on Management of Data*, Minneapolis, MN, May 1994, pp. 11. http://www.cs.umass.edu/Dienst/UI/2.0/Describe/ncstrl.umassa_cs/UM-CS-1994-027.

E. T. Mueller, J. D. Moore & G. J. Popek, "A Nested Transaction Mechanism for LOCUS," in *Proc. of 9th Int'l Symposium on Operating System Principle* (SOSP), 1983, pp. 71-89. http://www.cis.upenn.edu/~bcpierce/courses/dd/topics.html.

J. Eliot, B. Moss, "Nested Transactions: An Approach to Reliable Distributed Computing," PhD Thesis, MIT, Apr. 1981, pp. 23-130 & pp. 137-140. http://citeseer.nj.nec.com/eliot81nested.html.

Prototype implementation of Apotram in the EXPRESS Data Manager product of EPM Technology, Oslo, Norway, Jan. 1997, 9 pages. http://www.epmtech.jome.com.

S. K. Shrivastava & S. M. Wheater, "Implementing Fault-Tolerant Distributed Applications Using Objects and Multi-Couloured Actions," in *Proc. of Int'l Conf. on Distributed Computing Systems*, Paris, France, May 1990, pp. 1-15.

T. Härder & K. Rothermel, "Concurrency Control Issues in Nested Transactions," pp. 1-32, Published in the VLDE Journal, 1993, vol. 2, No. 1, pp. 39-74,. http://citcseer.nj.nec.com/473908.html.

T. Härder et al., "Supporting Parallelism in Engineering Databases by Nested Transactions," Technical Report #34/1992, Univ. of Kaiserslautern, 27 pages. http://wwwdbis.informatik.uni-kl.de/pubs/papers/HPS92.SFB.html.

C. Pu, G. E. Kaiser, & N. Hutchinson, "Split Transactions for Open-Ended Activities," in *Proc. of the ACM SIGMOD Int'l Conf. on Management of Data*, 1998, 13 pages. http://citeseer.nj.nec.com/pu88splittransactions.html.

G. E. Kaiser & C. Pu, "Dynamic Restructuring of Transactions," *Database Transaction Models for Advanced Applications*, Data Management Systems, Morgan-Kauffman, 1992, pp. 1-27. http://citeseer.nj.nec.com/kaiser92dynamic.html.

L. Daynès, "Implementation of Automated Fine-Granularity Locking in a Persistent Programming Language," *Software—Practice and Experience*, John Wiley & Sons, Ltd., 1999, pp. 1-38.

L. Daynes, et al, "Customizable Concurrency Control for Persistent Java," *Advanced Transaction Models and Architectures*, Data Management Systems, Kluwer Academic Pub., Boston, 1997; Chap. 7, pp. 1-34.

L. Daynès et al., "Efficient Support for Customizing Concurrency Control in Persistent Java," in *International Workshop on Advanced Transaction Models and Architectures* (ATMA), India, Sep. 1996, pp. 1-16. http://citeseer.nj.nec.com/daynes96efficient.html.

* cited by examiner

# US 7,234,076 B2

MULTI-LEVEL UNDO OF MAIN-MEMORY AND VOLATILE RESOURCES

CROSS-REFERENCE TO RELATED APPLICATION(S)

This application claims priority from co-pending U.S. provisional patent application Ser. No. 60/357,191, filed on Feb. 15, 2002, entitled "Techniques for Delegation of Main-Memory Resident objects and Multi-Level Undo", naming Laurent P. Daynès and Grzegorz J. Czajkowski as inventors, and which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

The present invention relates to information processing and systems therefor, and, more particularly, to techniques for managing objects in a such systems (e.g., techniques that offer multiple levels of undo and support for delegation of updates on main-memory resident objects accessible by concurrent transactions).

2. Description of the Related Art

Mechanism for automatically noting updates to object and/or memory in information processing systems have been devised in the context of persistent programming languages (PPLs) and Object-Oriented Database Management Systems (ODBMS). These mechanisms are geared towards gathering the new values of the persistent objects updated by a program so as to propagate them atomically to durable storage upon instruction by the program to do so (via a commit or checkpoint operation). Noting mechanisms typically work in two steps. First, during normal execution, modified objects are "noted" using some auxiliary data structure (a bit in the object header, or a card table, or a remembered set). Then, upon a commit or checkpoint request, the updates to the noted objects are reported atomically onto durable storage, typically by recording the updates onto a log (so as to minimize commit or checkpoint latency), then by propagating opportunistically the updates to the copies of the objects in secondary storage. Depending on the strategy chosen and on the noting mechanisms, the noted objects may be logged in their entirety, or their updated part is precisely identified by comparing their copy in main-memory with the one obtained from secondary storage. Although these mechanisms have been designed for fine-grained logging of updates in programming systems that combine programming languages with transactional capabilities, they are generally inadequate to support undo operations. This is because undo operations require taking an image of at least the updated part before the update takes place (whereas noting mechanisms only identify those objects that have been modified). PPL and ODBMS support undo but only to persistent objects. Thus, the mechanisms employed are unfit for systems without a backing store. Additionally, these noting mechanisms were designed for architecture where each transaction accesses persistent objects via a private buffer, and are therefore not viable for systems that support the execution of multiple concurrent transactions that directly access the same set of main-memory resident objects (such as systems that allow maintaining a single shared buffer of persistent objects directly accessible and modifiable by all transactions). Lastly, these noting mechanisms do not address multiple levels of undo or delegation of updates.

Main-memory resident database systems employ undo techniques that may be fit for use on volatile objects. Some implementations employ undo log records that are maintained in volatile main memory. In addition, some implementations also maintain a per-transaction private log of undo records to avoid synchronization when generating an undo log record. However, conventional techniques do not support features desired or required by advanced transaction models, e.g., multiple level of undo and delegation of updates.

Some implementations of disk-oriented traditional database systems include undo mechanisms with support for multiple level of undo and delegation. However, these mechanisms are too heavyweight and the assumptions they make are inappropriate for the runtime of a modern programming language. In particular, the mechanisms they employ assume that updated objects are stored at a fixed location for the duration of the transaction (e.g., the same disk page). Such an assumption conflicts with the automated heap management adopted by modern programming languages which may cause objects to relocate in memory at any time. To ensure that updates are rolled back in exactly the reverse order they were performed, each log record is assigned a unique, monotonically increasing, log sequence number (LSN). A LSN identifies a location in the log, and is used to mark the page(s) that contains the updates recorded in the corresponding log record. The use of LSN is specific to the write-ahead logging techniques. Accordingly, conventional approaches do not offer, and consequently there is a need for, multiple levels of undo, perhaps together with support for delegation of updates, for example, on a main-memory resident shared heap of objects accessible by concurrent transactions.

BRIEF DESCRIPTION

The present invention relates to information processing and systems therefor, and, more particularly, to techniques for managing objects in a such systems (e.g., techniques that offer multiple levels of undo and/or support for delegation of updates on main-memory resident objects accessible by concurrent transactions). For example, a log associated with each transaction stores information regarding an update to an object when the object is locked in an update mode (e.g., a write mode) by the transaction. The transaction can be rolled back by restoring information from the log of the transaction to the object. If the transaction commits, then the log may be destroyed. If the transaction delegates to another transaction, the log of the transaction is also delegated. A record codelet can be automatically generated to perform the storing of information in the log, and a restore codelet can be automatically generated to undo updates by restoring information from the log to the updated objects. The codelets may be specific to each class of objects.

In one embodiment, a method provides the capability of undoing an object update in a memory (typically a volatile memory or main memory) of an information processing system. A loading event is detected for a class in the information processing system and at least one class-specific codelet is generated responsive to the loading event. The class-specific codelet corresponds to the loaded class. For example, a record codelet and restore codelet may be generated. In a further embodiment, the record codelet includes instructions for logging information regarding a state of an object in the class prior to the object being updated, and the restore codelet includes instructions for undoing an update to an object in the class using information logged by the record codelet. In another further embodiment, the step of generating the record codelet comprises generating instructions for copying mutable field values of an object to a log of a transaction, and generating instructions for copying lock state information (e.g., for subsequent identification of undo log records that will not be used to restore the state of an object during rollback) regarding the object to the log. The instructions for copying the mutable field values and the instructions for copying the lock state information may be executed the first time a lock is acquired on an object by each transaction in a mode that grants updates (e.g., a write lock or other type of update lock).

If a rollback condition is detected, the restore codelet may be executed to undo updates to objects performed by the transaction using information from the log, for example, by identifying the oldest updates to the object using the lock state information and undoing the oldest updates to the object, and/or by scanning the log for lock state information fields and copying mutable field information from the log to the object if each lock state information field does not include information indicating that the transaction was a prior lock state owner. The mutable field information may be ignored if each lock state information field includes information indicating that the transaction was a prior lock state owner. Undoing of updates may be performed using lock state information to determine an oldest update without regard to an order in which the mutable field information is stored in the log.

In another embodiment, a method of recording resource update undo information for subsequent update undo is provided in which mutable field values of an object are copied to a log corresponding to a transaction and prior lock state information regarding the object is copied to the log. The prior lock state information is indicative of the value of a lock of the object prior to a new lock of the object by the transaction. The copying may be performed the first time a lock in a mode that grants updates is acquired on an object by each of a plurality of transactions.

In another embodiment, a computer program product provides a capability of undoing an object update in a memory (e.g., a main memory or other volatile memory) of an information processing system. The product includes code for generating at least one class-specific codelet (e.g., a record codelet and/or a restore codelet) corresponding to the class responsive to a loading event. One exemplary record codelet includes code for generating instructions for copying mutable field values of an object of the class to a log of a transaction, and code for initiating a lock barrier to provide prior lock state information to the log. In further embodiments, code may be included to initiate copying of log information upon each lock acquisition and for initiating a copy-back upon the occurrence of a rollback condition being detected. In a further embodiment, the code for generating the restore codelet specifically includes code for generating instructions in the restore codelet for undoing the oldest updates to the object. In yet a further embodiment, code is included for rolling back the change of a transaction, including code for identifying the oldest undo log records for each object with undo information recorded in the log by using the lock state information, and selectively invoking the restore codelet on these oldest undo log records.

In another embodiment, an apparatus includes means for copying all mutable field values of an object to a log corresponding to a transaction, and means for copying prior lock state information regarding the object of the class to the log, the prior lock state information indicative of a value of a lock of the object prior to a new lock of the object by the transaction. In a further embodiment, the apparatus further includes means for performing the copying of the mutable field values and the prior lock state information each time a lock is acquired on the object by the transaction. In another further embodiment, the apparatus includes means for detecting a rollback event of the transaction and means for undoing updates to objects performed by the transaction using information from the log. In yet a further embodiment, the means for undoing the updates includes means for using the lock state information to determine an oldest undo log record without regard to an order in which the undo log records are stored in the log. In yet another further embodiment, the means for undoing the updates includes means for scanning the log for lock state information, and means for copying mutable field information from the log to the object if the lock state information does not indicate that the transaction is an owner of the lock whose value is represented by the lock state. In another embodiment, the apparatus includes a virtual machine including means for copying the mutable field values and the for copying the prior lock state information. In another embodiment, the apparatus includes a processor and a memory coupled to the processor, the memory including the means for copying the mutable field values and the means for copying the prior lock state information.

The foregoing provides a brief description, or summary, of certain embodiments discussed in greater detail in the description below. Consequently, the foregoing contains, by necessity, simplifications, generalizations and omissions of detail. Consequently, those skilled in the art will appreciate that the foregoing summary is illustrative only and that it is not intended to be in any way limiting of the invention. Other aspects, inventive features, and advantages of the present invention, as defined solely by the claims, may be apparent from the description set forth below.

DETAILED DESCRIPTION

The following discussion is intended to provide a detailed description of at least one example of the invention and should not be taken to be limiting of the invention itself. Rather, any number of variations may fall within the scope of the invention which is properly defined in the claims following this description.

Figure 1:
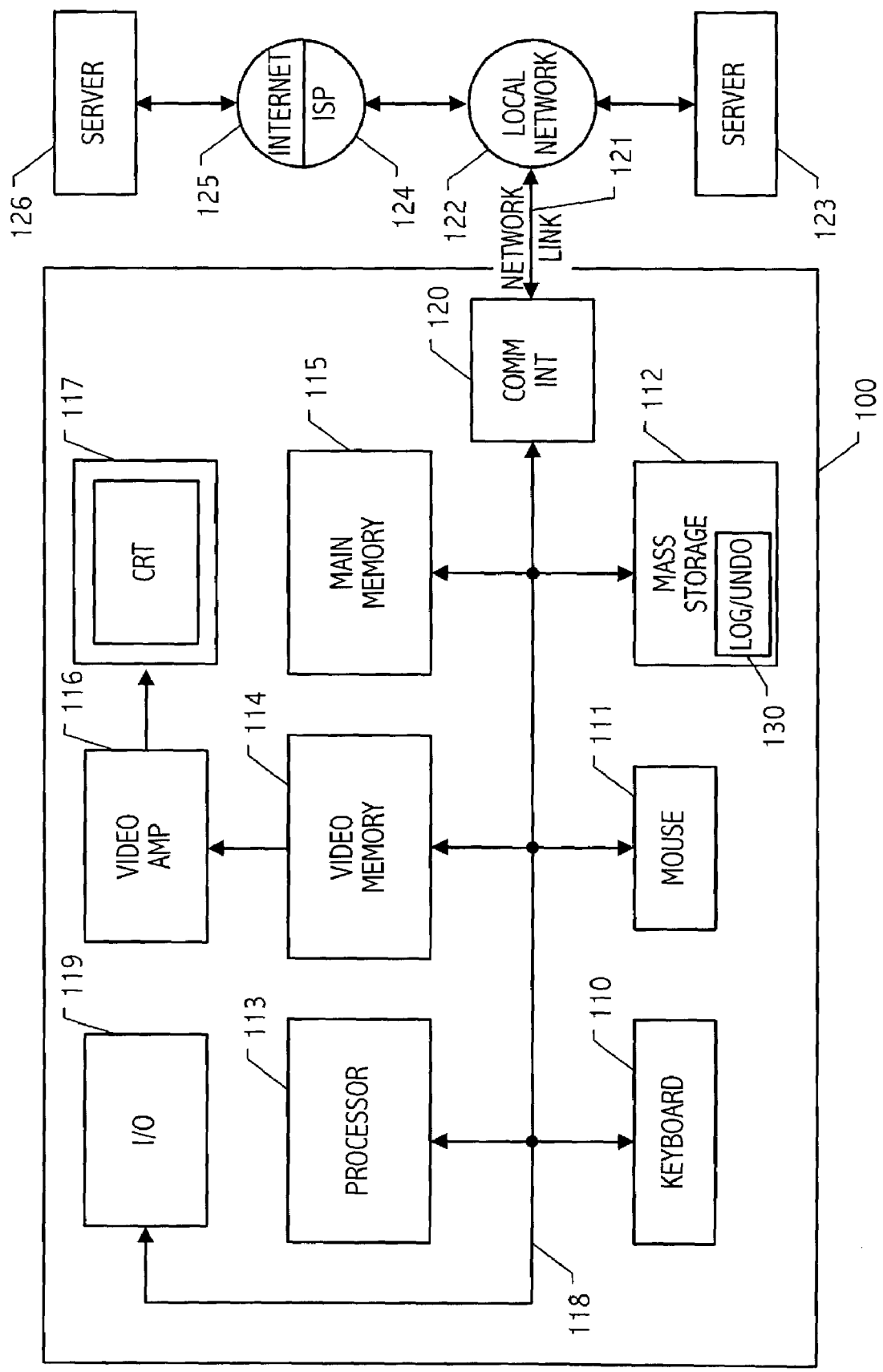
FIG. 1 is a block diagram of one embodiment of an information processing system/network configurable for main-memory delegation and multi-level undo in accordance with the invention.

An embodiment of the invention can be implemented as computer software in the form of computer readable code executed on a general purpose computer such as computer 100 illustrated in FIG. 1, or in the form of bytecode class files executed by a virtual machine program. A keyboard 110 and mouse 111 are coupled to a bi-directional system bus 118. The keyboard and mouse are for introducing user input to the computer system and communicating that user input to processor 113. Other suitable input devices may be used in addition to, or in place of, the mouse 111 and keyboard 110. I/O (input/output) unit 119 coupled to bi-directional system bus 118 represents such I/O elements as a printer, A/V (audio/video) I/O, etc.

Computer 100 includes a video memory 114, main memory 115 and mass storage 112, all coupled to bi-directional system bus 118 along with keyboard 110, mouse 111 and processor 113. The mass storage 112 may include both fixed and removable media, such as magnetic, optical or magnetic optical storage systems or any other available mass storage technology. As shown, mass storage 112 includes log/undo module 130 which is a software module including instructions for performing certain logging and undo operations which are described below. Bus 118 may contain, for example, thirty-two address lines for addressing video memory 114 or main memory 115. The system bus 118 also includes, for example, a 32-bit data bus for transferring data between and among the components, such as processor 113, main memory 115, video memory 114 and mass storage 112. Alternatively, multiplex data/address lines may be used instead of separate data and address lines.

In one embodiment of the invention, the processor 113 is a microprocessor manufactured by Motorola, such as the 680X0 processor or a microprocessor manufactured by Intel, such as the 80X86, or Pentium processor. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem, communication interface 120 provides a data communication connection to the corresponding type of telephone line, which comprises part of network link 121. If communication interface 120 is a local area network (LAN) card, communication interface 120 provides a data communication connection via network link 121 to a compatible LAN. Wireless links are also possible. In any such implementation, communication interface 120 sends and receives electrical, electromagnetic or optical signals which carry digital data streams representing various types of information.

Network link 121 typically provides data communication through one or more networks to other data devices. For example, network link 121 may provide a connection through local network 122 to local server computer 123 or to data equipment operated by an Internet Service Provider (ISP) 124. ISP 124 in turn provides data communication services through the world wide packet data communication network now commonly referred to as the "Internet" 125. Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, remote server computer 126 might transmit a requested code for an application program through Internet 125, ISP 124, local network 122 and communication interface 120. In accord with the invention, one such application is that of remotely configuring a computer.

The received code may be executed by processor 113 as it is received, and/or stored in mass storage 112, or other non-volatile storage for later execution. In this manner, computer 100 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

The description that follows presents a set of techniques, systems, objects, functional sequences and data structures associated with concurrency controls for cooperative operations on resources. Any type of programming language that produces programs that are executable with a managed execution environment and where the runtime handles memory management and guarantees safety may be used. Currently, most commercial incarnations of such programming languages are object-based (e.g., Java™, Smalltalk™, C# programming languages) but object-based environment is not required. Thus, an exemplary implementation focuses on an environment typical of programming systems that couple an object-based programming language, such as Java or Smalltalk, with transactional capabilities in order to allow a heap of objects to be directly operated on by multiple, potentially concurrent, applications. Typically, in such an exemplary implementation, applications are executed using transactions, and a runtime environment typically enforces the concurrency controls of the transaction model in use. Of course, concurrency controls may be enforced in other ways, such as by the application itself, in some embodiments. The object heap may or may not be backed by a persistent store, and any of a variety of mechanisms may be employed for persistence and/or durability. Thus, certain embodiments are of interest to persistent programming languages (PPL), object-oriented database management systems (OODBMS), and other non-persistent programming systems that use automated concurrency controls in order to enforce safe sharing between applications.

Resources and transactions may contain multiple related functions and data structures. Since certain embodiments utilize a standard object oriented programming (OOP) language to write and encapsulate an application's transactions, functions, and data structures, a discussion of various aspects of object-oriented programming, and its encapsulation of related data structures and methods, is provided.

Object-oriented programming is a method of creating computer programs by combining certain fundamental building blocks, and creating relationships among and between the building blocks. The building blocks in object-oriented programming systems are called "objects." An object is a programming unit that groups together a data structure (one or more instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction sent to the object to execute a certain method. A message consists of a method selection (e.g., method name) and a plurality of arguments. A message tells the receiving object what operations to perform.

One advantage of object-oriented programming is the way in which methods are invoked. When a message is sent to an object, it is not necessary for the message to instruct the object how to perform a certain in method. It is only necessary to request that the object execute the method. This greatly simplifies program development.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214-223.

A class defines a type of object that typically includes both variables and methods for the class. An object class is used to create a particular instance of an object. An instance of an object class includes the variables and methods defined for the class. Multiple instances of the same class can be created from an object class. Each instance that is created from the object class is said to be of the same type or class.

Some exemplary realizations of the present invention are presented in the context of locking and logging mechanisms since such mechanisms are popular techniques when it comes to enforcing concurrency control in systems that fit in the description given above. In particular, many of the exemplary realizations assume that locking is performed to enforce concurrency control, that locking is performed at the granularity of individual object, and that the first update to an object by a transaction coincides with a write lock acquisition. In other words, the exemplary realizations assume that transactions are well-formed. Without loss of generality, and to simplify the presentation, much of the description in this document assumes that locking is performed automatically by the runtime of the system. Automated locking is achieved by preceding with a lock barrier every access to an object that may result in a first access to the object by a transaction. Lock barriers are small sequences of instructions that detect when a lock needs to be acquired. In turn, they either perform lock acquisition in-line, or transfer control to the lock manager to obtain the lock. However, implementations suitable for other concurrency controls may be employed in other realizations. Even in the case of realizations that build on lock mechanisms, no specific lock management method is required. Nonetheless, exemplary realizations are described herein with lock value sharing techniques in mind.

A lock manager or the like may be used to provide lock based concurrency control. Lock-based concurrency control works by associating each unit of concurrency with a lock, and by guarantying that programs, executed as transactions, perform an operation on a unit of concurrency if and only if they own the associated lock in a mode that corresponds to the operation to perform. The term object locking refers to the case where objects of a object-oriented programming systems are the unit of concurrency, i.e., each object is associated with a lock. A lock records the identity of the transactions that are given the right to execute operations on the object guarded by that lock. The transactions recorded by a lock are called the owners of that lock. A transaction is recorded by the locking modes (e.g., read or write mode) the transaction is granted to. There is one locking mode defined per kind of operation (locking modes and operations are discussed below). As a result, a lock has one set of owners (transactions that are granted the lock) for each locking mode that the lock must keep track of.

Formally, a lock has a value composed of one owner set per lock mode. M:{...} denotes the owner set for the lock mode M. M:{ } denotes that no transaction owns the lock in mode M (i.e., the owner set for mode M is empty). M:{T1, T2 ... Tn} denotes that transactions T1, T2 ... Tn own the lock in mode M. That is, transactions T1 T2 ... Tn are granted the right to perform operations that correspond to mode M to the object protected by the lock. A transaction is granted a lock L in a mode M according to some conflict detection function that determines whether the request <T,M> conflicts with the current value of lock L. When the lock L is granted in mode M to a transaction T, T is added to the owner set that corresponds to M. To simplify conflict detection, T may also be added to the owner set of any other mode N such that mode M also grants operations already granted by N. For example, assuming a lock management system that supports two lock modes, R (for read) and W (for write), granting a lock in read mode allows for read operations only, whereas granting a lock in write mode grants for both read and write operations. Thus, the value of the lock of an object locked in write mode by transaction T1 is composed of R:{T1} and W:{T1}. The value of the lock of an object locked only in read mode by transaction T1 is composed of R:{T1} and W:{ }. The value of the lock of an unlocked object is composed of two owner sets R:{ } and W:{ }. When a transaction releases a lock, it is removed from all the owner sets in which it appears. When a transaction T delegates a lock to a transaction Tx, T is replaced with Tx in all the owner sets in which T appears.

In some implementations, a lock can be represented by a lock data structure. In such implementations, object locking is achieved by associating each object with a lock data structure whose value is updated by locking operations (lock acquisition, lock release, lock delegation). In some other implementation, a lock can be represented by a pointer to a data structure that represents a particular lock value, and called a lock state. In this case, object locking is achieved by storing a pointer to a lock state in each object, and locking operations (lock acquisition, lock release, lock delegation) are achieved by atomically changing the pointer to a lock state stored in an object with a pointer to another lock state that represents the new value of the lock of that object. This second type of lock management implementation is called lock value sharing (or sometimes, lock state sharing), and is an advantageous method of locking for this invention.

Under lock value sharing, if two objects have a lock of equal value, their lock state pointers may point to the same lock state. Lock value sharing promotes this form of sharing to reduce the memory consumption of object locking. To this end, a lock manager implementing lock value sharing maintains an associative table of lock states, or TLS for short. The TLS records all lock states which hold a lock value currently in use by the system. Locking operation works by computing the new value of a lock based on the current lock state associated with an object, and by searching the TLS for a lock state implementing this new lock value. If no lock state is found for this lock value, a new one is created and entered the TLS.

A global locking operation is a locking operation that changes the value of all the locks that are assigned the same value. Implementation of lock value sharing implement global locking operations by updating in place one or more lock states, instead of changing the pointer to lock state pointers stored in objects. Global locking operations are used to implement bulk lock release (i.e., the release of all the locks of one transaction at a time) and bulk lock delegation (the delegation of all the locks of one or more transactions to one or more other transactions). Bulk lock operations are implemented by scanning the TLS to locate all the lock states that encode the value of lock owned by a specific lock owner. The effect of a bulk locking operation is obtained by updating the value of all the lock states thus found. Because a lock state can potentially represent the value of many locks, changing its value changes the values of all such locks. For this reason, updating a lock state is only used to implement the effect of a locking operation that should affect all the locks represented by that lock state, which is the case for bulk locking operations.

Lock value sharing is a lock management technique that is particularly adept in addressing the performance requirements of programming systems that couple a programming language with transactional capabilities. In general, a variety of lock value sharing techniques and implementations may be employed. See generally, L. Daynes, *Implementation of Automated Fine-Granularity Locking in a Persistent Programming Language,* Software-Practice and Experience, 30(4):325-361, 2000, L. Daynes, G. Czajkowski, *Lightweight Flexible Isolation for Language-based Extensible Systems,* Proceedings of the 28th International Conference on Very Large Data Bases (VLDB02), Hong-Kong, August 2002; and, L. Daynes, G. Czajkowski, *High-performance, Space-efficient, Automated Object Locking,* IEEE 17th International Conference on Data Engineering, Heidelberg, Germany, Apr. 2-6 2001, all of which are incorporated herein by reference in their entirety. Further details regarding exemplary locking systems, and various techniques for lock barrier implementation, lock acquisition, lock release and lock state representation are provided in U.S. Pat. No. 6,182,186 B1, entitled "Method and Apparatus that Utilizes Lock States to Lock Resources" issued to Laurent Daynes on Jan. 30, 2001, and in U.S. Pat. No. 6,343,339 B1, entitled "Method and Apparatus that Utilizes State Locks to Lock Resources" issued to Laurent Daynes on Jan. 29, 2002, and in U.S. patent application Ser. No. 09/992,720, entitled *Validation Technique for Bulk Lock Delegation,* naming Daynes as inventor, all of which are hereby incorporated by reference in their entirety. Other exploitations for other language and/or transaction environments, as well as other concurrency control implementations, now defined or hereafter developed, may also employ techniques of the present invention for efficient support of multiple levels of undo and delegation of updates to main-memory resident, potentially volatile, objects that are directly accessible by multiple transactions.

Figure 2:
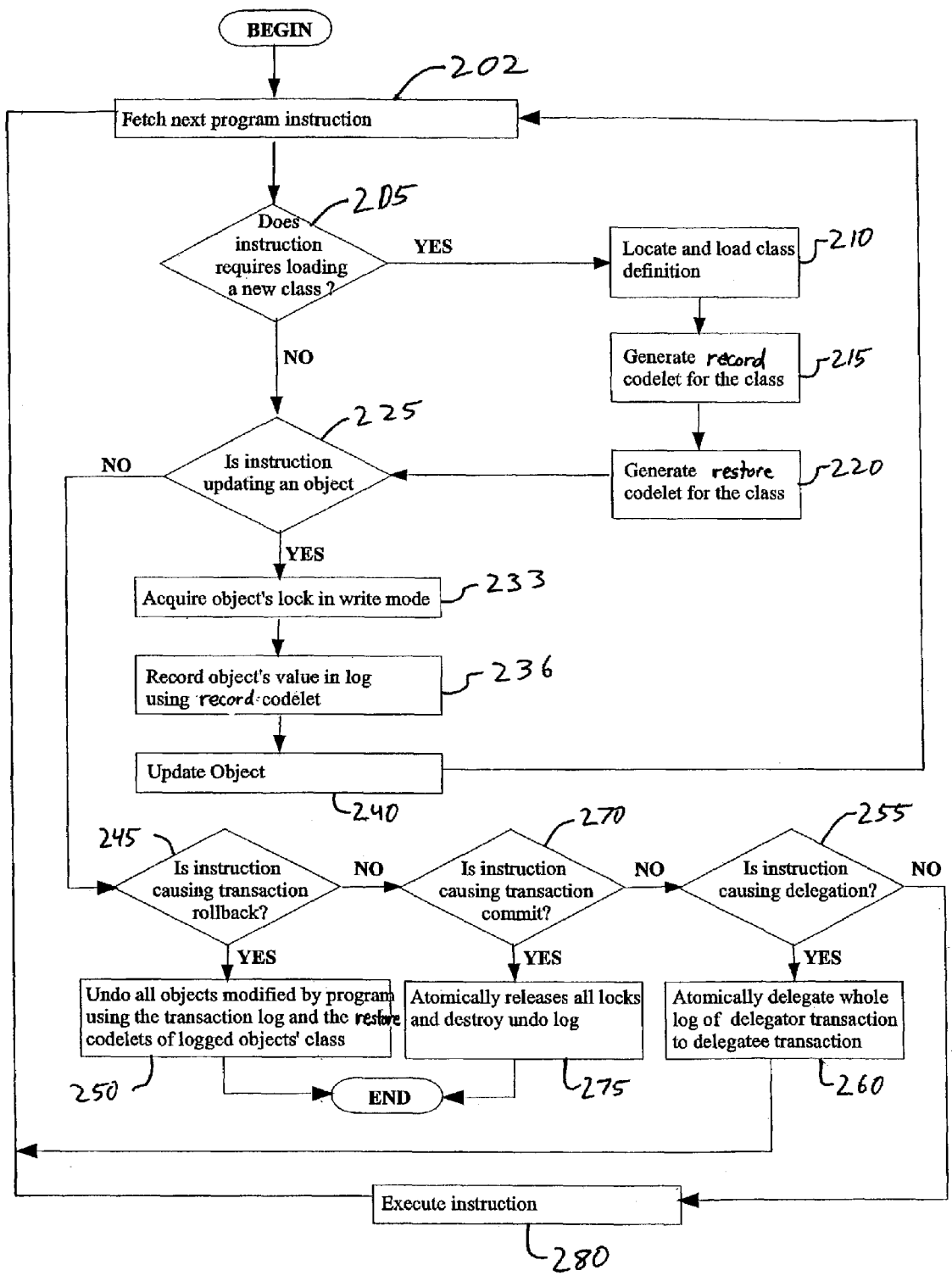
FIG. 2 is a flowchart showing an exemplary overall operational flow for main-memory delegation and multi-level undo within a system such as that of FIG. 1.

FIG. 2 shows an operation flow of one exemplary embodiment of a system incorporating undoable object updates. The operational flow is illustrated for purposes of demonstration of the various functionality possible within an embodiment. It is not meant to be an exclusive representation of functionality, and is not meant to be an exclusive representation as to the order of functionality. One of ordinary skill in the art will realize that the functionality described herein with reference to FIG. 2 and elsewhere may be performed with other appropriate ordering and controlled flow, and with many such operations possibly occurring substantially simultaneously or potentially in parallel (e.g., with different objects, transactions, etc.).

Programs written in languages such as the Smalltalk language or the Java language tend to generate a population of very small objects (objects are typically below 40 bytes on the average, with large percentage of the population below 24 bytes). The mutable part of these objects is often even smaller (e.g., objects in some implementation of the Java programming language have an 8 bytes header, which is immutable with respect to application's updates; some objects may also include identifiable immutable fields, i.e., "final" variables in the Java programming language).

Given the above observations, recording all the mutable fields of an object upon the very first update to it is advantageous. First, a transaction needs only to append one undo log record to its log regardless of how many updates it performs on the object, and regardless of how many fields are updated. Second, no additional tests beyond the existing lock barrier need to be made to detect when a transaction needs to produce an undo log record. The first acquisition of a lock in a mode that denote operations that may update the object coincide with when an undo log record must be created. Large arrays are an exception and may be treated differently with respect to logging, as logging the whole array is wasteful of resources. In this case, an additional barrier can be employed to detect whether the portion of the array that is about to be updated has been already updated. Also, because the mutable part of an object is very small, the creation of undo log records can be achieved with a small number of load and store instructions.

Thus, instead of having a single generic method for creating undo log record that needs to interpret the meta-data of a class that describes the layout of the class instances, each class is associated with a small "record" codelet that is generated using the class meta-data. Such codelets are similar to unrolled loops over the mutable fields of the instance of a class. In other words, they comprise only load and store instructions that copy mutable fields in a cache friendly-manner, and do not include any transfer of control instructions (which are expensive on most processor architecture). Thus, these class-customized codelets enable faster logging than a generic method.

As illustrated in FIG. 2, a record codelet and a restore codelet are generated for each class (e.g., each object class in system 100 or some subdomain thereof or some other domain controllable or accessible by system 100). Generation of codelets may take place at runtime, upon dynamic loading of a class into a running program, as illustrated in FIG. 2. Alternatively, in programming systems with static linking, the codelets may be generated at compile time, by the compiler itself. Each transaction is associated with an undo log (or simply, "log"). As explained earlier, the record codelet is a sequence of instructions, customized for a given class, that records in the log of a transaction the necessary information to undo the updates to an instance of the class by that transaction. The records in the log of a transaction may be delegated to another transaction. Alternatively, they may be used to undo the updates of a transaction if instructed to roll its changes back. Upon such a roll back, the records from the transaction's log are used by the restore codelets to restore the value of objects modified by the transaction.

Referring to FIG. 2, a next program instruction is fetched at fetch operation 202. After the next instruction is fetched, the instruction is processed to determine if the instruction requires loading a new class during new class decision 205. If so, a new class definition is located and loaded during class load operation 210. After the class is loaded, a record codelet is generated for the loaded class during generate record codelet operation 215. For example, a record codelet may be generated which includes instructions for accessing mutable fields of an object of the class to store the mutable information in a log of a transaction.

After generate record codelet operation 215, a restore codelet (sometimes called an undo or recovery codelet) is generated for the class during generate restore codelet operation 220. For example, a restore codelet may be generated which includes instructions for accessing a log of a transaction to restore mutable fields of an object of the class to a pre-update state to undo a transaction's update of the object.

The codelet can be generated at runtime upon the first use of the class, for example, when the runtime of the programming language supports reflection on objects of the language. In languages with reflective capabilities, information about the layout of an object, and the location of reference and scalar values within it, can be obtained at runtime from the object itself. The mutability of each field of an object can be determined by inspecting the code of the methods of the objects. Typically, such meta-data are stored in a class object whose reference is stored within a header of the object. In this case, the codelets for recording and restoring the state of an object are added to the class of the objects. Alternatively, or when reflection is not supported, the codelets can be generated at compile-time and their addresses can be stored in the virtual method table of each object.

The record and restore codelets associated with a class are generated using the class's description of the layout of its instances and the type of their fields. The code generated for such codelets is typically made up of a pair of load/store operations per mutable field (this could be compacted for Boolean, bytes and short fields in order to limit the number of stores at logging time), an add instruction to update pointer to the tail of the log, and a return instruction. A typical codelet (illustratively represented in SPARC™ assembler—SPARC is a trademark or registered trademark of SPARC International, Inc.) for recording an object in the undo log of the current thread may be implemented as follows:

```
# Assumed register usage:
# obj     %o0
# tail    %o4
# tmp1    %g1
# tmp2    %g4
# tmp3    %l6
// Object's reference is already recorded before this point
// i.e.,    st obj, [tail + 0] -- see later.
    ld [obj + offset_to_pointer_field_1], tmp1
    ld [obj + offset_to_pointer_field_2], tmp2
    ld [obj + offset_to_pointer_field_3], tmp3
    st tmp1, [tail+4]
    st tmp2, [tail+8]
    st tmp3, [tail+12]
    ld [obj + offset_to_scalar_field_1], tmp1
    ld [obj + offset_to_scalar_field_2], tmp2
    st tmp1, [tail+16]
    st tmp2, [tail+20]
    retl       # Return to callee (using leaf call optimization
[])
    add tail, 24, tail      # update log tail pointer
```

A codelet for the reverse operation of restoring an object to a pre-update state from an undo log record can be obtained similarly. An exemplary set of code for generating a restore codelet is as follows:

```
# Object's reference is already from the in register obj,
# and register tail is set at the beginning of the undo log record.
# Register tmp1, tmp2 and tmp3 are available scratch registers.
    ld [tail+4], tmp1
    ld [tail+8], tmp2
    ld [tail+12], tmp3
    st tmp1, [obj + offset_to_pointer_field_1]
    st tmp1, [obj + offset_to_pointer_field_2]
    st tmp1, [obj + offset_to_pointer_field_3]
    ld [tail+16], tmp1
    ld [tail+20], tmp2
    st tmp1, [obj + offset_to_scalar_field_1]
    st tmp2, [obj + offset_to_scalar_field_2]
    retl       # Return to callee  (using leaf call optimization
[])
    add tail, 24, tail      # move tail to next log record.
```

Referring again to FIG. 2, after the codelets are generated for the new class, control transitions to update object decision 225. If no new object class is to be created as determined during new class decision 205, control transitions from new class decision 205 to update object decision 225.

During update object decision 225, the instruction fetched during fetch operation 202 is processed to determined whether an object is to be updated by the instruction (e.g., by a transaction corresponding to the instruction). If no object is to be updated by the instruction, control transitions from update object decision 225 to restore decision 245 (discussed below). Otherwise, the object to be updated is locked and logged during lock and log operations 233 and 236, after which the object may be updated.

Specifically, if the instruction is to update an object, a lock is acquired on the object by a transaction corresponding to the instruction during lock operation 233. The lock is obtained in write mode so that the transaction is granted the right to update it. The object is locked to prevent concurrent or overlapping updates to the object by multiple transactions. After the object is locked, the locked object's value is stored in a log corresponding to the updating transaction during record operation 236. The record codelet generated during operation 215 is accessed to, for example, store the pre-update state of mutable fields of the object in the log during record operation 236 to allow the potential for subsequent recovery from the pending update to the object. In the presently described embodiment, the locking and logging of the object are performed together or as part of a combined lock and log barrier as part of an access of the object by the transaction. The locking and logging are discussed in further detail below at least with reference to FIG. 3. After the object is locked and logged, the object may be updated during update operation 240. After the object is updated and the log is updated, control transitions to fetch operation 202 whereupon a new instruction is fetched.

During restore decision 245, the fetched instruction is processed to determine whether a transaction is to be rolled back (e.g., one or more updates to objects by a transaction or transactions are to be undone). If the instruction is not a rollback instruction, control transitions to commit decision 270 (discussed below). If the instruction is a rollback instruction, log information from a transaction which updated an object is used to restore the object to a pre-update state during restore operation 250. For example, updates to all modified objects are undone using the transaction log and the restore codelets of the class for each logged object. The recovery from transactional updates is discussed in further detail below at least with reference to FIG. 4. After the update is undone, processing of the program is complete.

During commit decision 270, the fetched instruction is processed to determine if it causes a commitment of the transaction. If the instruction is not a commit instruction, control transitions to delegate decision 255 (discussed below). If the instruction is a commit instruction, all locks of the corresponding transaction(s) are atomically released and the corresponding undo log information is destroyed during commit operation 275. After the commitment is complete, processing of the program is also complete.

During delegate decision 255, the fetched instruction is processed to determined whether a transaction's log is to be delegated to another transaction as a result of the instruction. If the instruction is not a delegation instruction, control transitions to execute operation 280 whereupon the fetched instruction is executed. After the instruction is executed, the next instruction is fetched at fetch operation 202. If the instruction is a delegation instruction, control transitions to delegate operation 260. An entire log of a delegator transaction is atomically delegated to a delegatee transaction during delegate operation 260. Control of log information from the delegator transaction is passed to the delegatee transaction during delegate operation 260. The delegation operation is discussed in further detail below at least with reference to FIG. 9 and Tables 1 and 2 below. After the delegation is complete, control transitions to fetch operation 202 whereupon a next instruction is fetched for processing.

The sequence of operations discussed above with reference to FIG. 2 is merely an exemplary sequence which is illustrative of an exemplary life cycle of an object. Of course, the above sequence of operations, and the sequences of operations in other figures described herein, can occur in many different orders, and any description of such sequence which specifies one operation as occurring before or after another operation is merely exemplary of one such sequence and is offered for demonstrative purposes only as opposed to limiting the embodiments to the discussed particular sequences.

Figure 3:
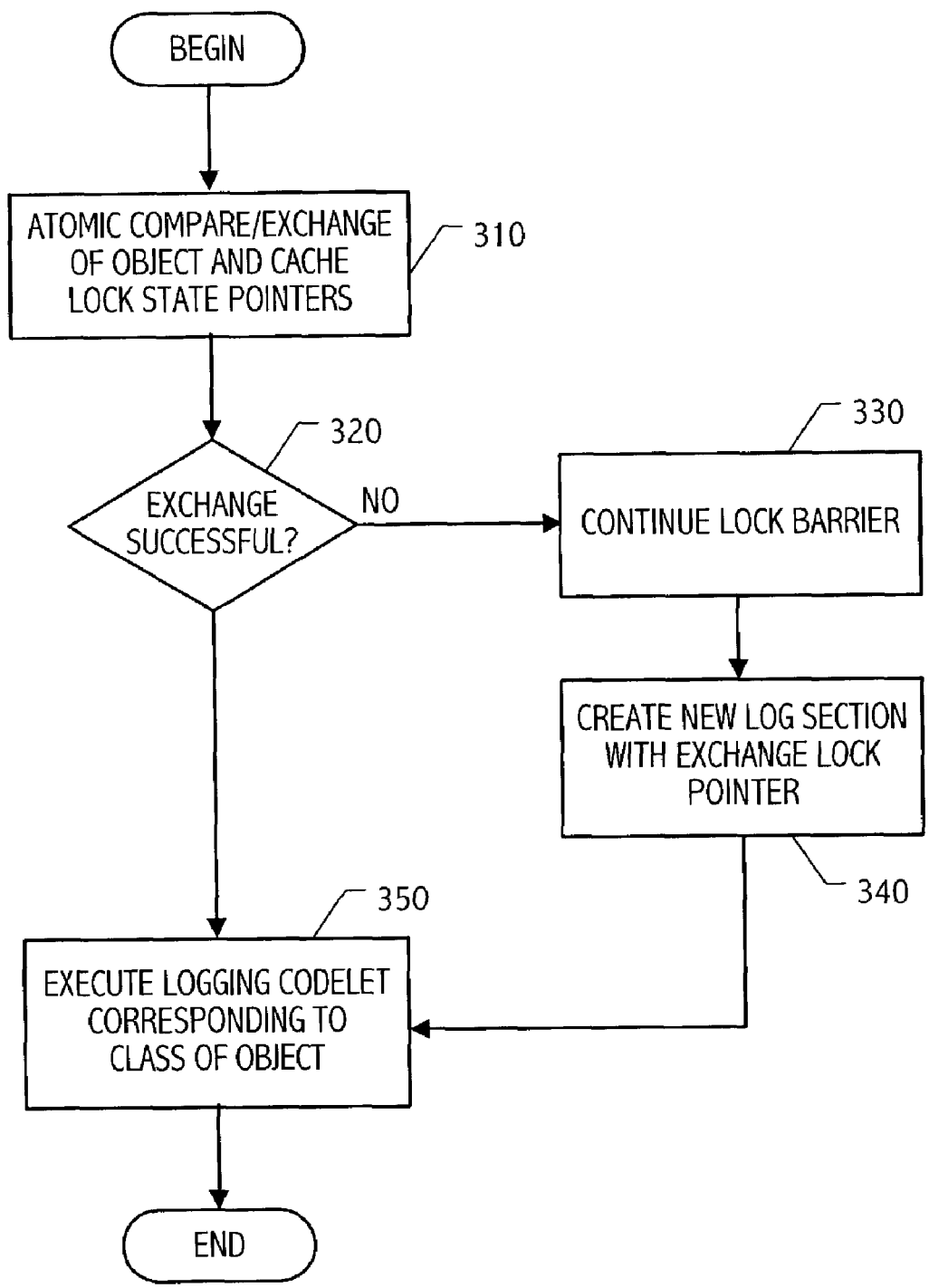
FIG. 3 is a flowchart showing an exemplary operational flow of a locking and logging process.

FIG. 3 illustrates an example of combined lock and log barriers. When an application transaction accesses an object, the runtime portion of the application implements a lock barrier to ensure proper concurrency control between the accessing transaction and other transactions which might access the object. In this embodiment, the runtime lock barrier incorporates a logging function so that a separate logging barrier is not required. This means that both lock acquisition and logging actions are triggered by the same test. Thus application code pays only the penalty of a single test. The acquisition of a write lock by a lock barrier for a transaction T denotes the first modification to the object protected by the acquired lock by T. Upon acquisition of the write lock, the value of the lock before the acquisition is recorded in the transaction's log, along with the reference to the object it protects, and the value of the mutable field of that object. When the lock manager implements lock value sharing, recording the value of the lock equates to recording the pointer to a lock state that holds that lock value.

FIG. 3 assumes that lock management is implemented as lock value sharing. Lock value sharing enables the use of a simple form of memoization to perform a locking operation. Memoization is possible because the effect of every locking operation on an individual object is achieved by atomically exchanging the lock state pointer in the object header with another lock state pointer. Memoization may be implemented by augmenting each thread of control running on behalf of a transaction with a cache of the exchanges of lock state pointers performed by recent locking operations. For instance, if the most recent locking operations performed by a thread running on behalf of transaction T1 are the following:

acquire lock O1, Read <exchanged 11 with 12>
acquire lock O2, Read <exchanged 11 with 12>
acquire lock O3, Write <exchanged 13 with 14> the memoization cache of the thread will contain, for read lock acquisition the pair of lock state pointers<11, 12>, and for write lock acquisition, the pair of lock state pointers<13, 14>. The first lock state pointer of a pair, called the "key", is a pointer to a lock state holding the value of the object's lock before the locking operation. The second lock state pointer of the pair, called the "value", is a pointer to a lock state that hold the value of the lock after the locking operation. The memoization cache is used by a lock barrier as follows: If the lock state pointer stored in object is equal to the key of the memoization cache, then exchange it with the value of the memoization cache. This compare-and-exchange of lock state pointer is performed atomically (e.g., using an atomic compare and exchange instruction, such as the CAS instruction of the SPARC instruction set). If the exchange fails, control is transferred to the lock manager, which will compute the new value of the lock and retrieve a corresponding lock state from the TLS. The pointer of the lock state returned by the TLS is then again atomically compared and exchanged with the lock state pointer stored in the object. This process proceeds until a conflict is found or the lock state pointer stored in the object holds a lock value that denotes acquisition of the lock by the requester. A variant of this basic principle of memoized-based locking can use a cache with multiple entries. Note that a lock barrier typically starts with a test of lock ownership to test whether the requested lock has already been acquired to avoid requesting a lock unnecessarily. For simplicity of presentation, FIG. 3 omits this lock ownership test.

The following SPARC assembly code illustrates how memoized locking operations can be implemented.

```
// load old lock state pointer from the cache
ld [Gthread, offset_to_cached_old_lockstate], oldls
// load new lock state pointer from the cache
ld [Gthread, offset_to_cached_new_lockstate], newls
// atomically compare-and-exchange the pointers
cas [obj+lock_pointer_offset], oldls, newls
// test if the exchange succeed
cmp oldls, newls
// yes, exit the barrier
be, end_of_lock_barrier
nop
// cache miss -- call the lock manager, which will also update
// the memoization cache.
call slow_get_write_lock_stub, obj, newls
nop
end_of_lock_barrier;
```

FIG. 3 illustrates the use of memoization in the combined lock and log barrier. An atomic compare and exchange of the object's lock state pointer with a cached lock state pointer is performed during atomic compare and exchange operation 310. If the exchange succeeds as determined during exchange succeed decision 320, then the locking function of the lock barrier is complete, and the address of the record codelet is fetched from the object's class and control of the application jumps to the record codelet during execute record codelet operation 350.

If the exchange does not succeed during atomic compare and exchange operation 310, then upon the cache miss, the lock manager is called to acquire the requested lock, and update the memoization cache accordingly during continue lock barrier operation 330. Once the memoization cache is updated, a new log section is created with the exchanged lock state pointer during new log section operation 340. After new log section operation 340, the address of the record codelet is fetched from the object's class and control of the application jumps to the record codelet (e.g., to record a pointer to the object and the object's mutable information) during execute record codelet operation 350.

Memoized lock operation provides a convenient way to determine when a thread has acquired a write lock on behalf of its transaction. In other words, a thread can tell whether it has made the very first update to an object on behalf of its transaction (i.e., if the CAS instruction succeeds, then the current thread is the one that performed the first update to the object). When this is detected, the thread must append an undo log record onto the log segment of the thread.

In one embodiment, each transaction is associated with a pool of log segments. Each log segment is made of a contiguous block of memory. Each thread running on behalf of a transaction is associated with a segment from the transaction's pool, and has exclusive use of the segment. Thus, logging does not, in general, require synchronization, except when a log segment is assigned to a thread or put back to the pool, and when new log segments are allocated.

Log segments are allocated in main memory and use a format optimized for main-memory usage. In particular, they contain references to heap allocated objects, and addresses to other main-memory data structures. When the runtime of the programming system manages a garbage collected heap, log segments should be allocated on the heap itself for simplicity. This also avoids special interaction with the garbage collection to deal with reference to heap objects from log segments, since the log segments are also under the control of the garbage collector.

For the purpose of clarity, we have assumed that each log record includes a pointer to the lock state that represents the value that the lock of the logged object had before the update took place. This information will often be redundant and can be factored out for multiple log records. Below is a depiction of a log segment where the lock state pointer is factored out. The log may be decomposed into sections, the beginning of which includes the pointer to the lock state that represented the lock of each of the logged objects. Factoring out pointers to lock state this way reduces both the space and processing overhead of logging.

```
Format of a log segment:
Header:
   length              // length of the log segment
   tail                // offset from the beginning of the log segment to its
                       tail
   prev_log_segment    // back link to other log segments, including
                       // those delegated to the transaction
   last_section        // index to where the last section starts
                       // (e.g. index to lock state pointer in log
   lock state pointer  // old lock state pointer of objects this log
   section
   next_section                  // offset from beginning to the next
   logged object pointer
   mutable pointer[]
   mutable scalars[]
   logged object pointer
   mutable pointer[]
   mutable scalars[]
   ...
   lock state pointer  // old lock state pointer of objects this log
   section
   next_section
   logged object pointer
   mutable pointer[]
   mutable scalars[]
   logged object pointer
   mutable pointer[]
```

In one embodiment, each log segment starts with a header, followed by one or more log sections. The header potentially includes information that describes the size of the segment, the offset to the tail of the segment which indicates where the next record will be written, a link to other segments of the segment's pool, and an offset to the start of the last section of the segment. Each log section contains a pointer to a lock state and an offset from the beginning of the log segment to the first byte of the next section.

The following C++ descriptions illustrate one suitable implementation of log segments and section headers.

```
class LogSegmentHeader {
    int              length;       // length of segment
    offset_t         tail;         // index to tail
    LogSegmentHeader *link;        // link to other segment, same
pool
    offset_t         last_section  // offset to the beginning of
last
                                   // section of the log
    // Here follows the first byte of the first section of the log
}
class LogSectionHeader {
    LockState  *ls;
    offset_t   next_section;
    // Here follows the first byte of the first log
    // record of the section.
}
```

In one embodiment, each undo log record has the following format. The record starts with the reference of the logged object, followed by each of its mutable references, then each of its mutable non-reference fields (referred as scalar values, or scalars for short). Although other formats may be employed, this organization is useful to simplify interaction with a garbage collector since all the references are located in a contiguous area of the log record. A log record does not have to include a description of how its content maps to the content of the corresponding object. Instead, the reference to the logged object is itself sufficient, because every object includes or is associated with specific code (e.g., a restore codelet) to record/restore its state to/from an undo log record. The generation of such code and the association of such code with objects is discussed above. The log records need not be linked together nor include a pointer to the transaction that generated them, since log segments are associated with a single transaction at a time. This contributes to an efficient implementation of bulk delegation, since no updates to log records are necessary to achieve delegation. When a transaction terminates, the space used for its log segment can be reclaimed immediately (either by dropping the references to it so that the garbage collector will reclaim the space the next time it is invoked, or by explicitly freeing storage not allocated in the garbage collected heap). Delegation of updates from one transaction to another is discussed below.

Lock management implementation that uses lock value sharing and memoized lock operations have a simple way of determining when a new log section must be created. When the memoization cache has a single pair of exchanged pointers to lock states for write lock acquisition, then a successful memoization indicates that the value of the lock of the object before its acquisition by the requesting transaction is the same as the one recorded in the header of the current log section. If memoization failed, it indicates that a new log section must be created in the log. Since execution is routed to the lock manager in this case, creation of the new log section can be made upon exiting the lock manager (operation 340). If more than one pair of exchanged lock state pointers is maintained in the memoization cache associated with write lock acquisitions, the lock barrier must be arranged such that the "key" of the first pair of lock state pointers used by memoization is the same lock pointer as the one recorded in the header of the current log section. In this case, a new log section must be created whenever memoization failed for the first cached pair of lock state pointers.

The following shows SPARC assembly code for a combined lock/log barrier. The lock ownership test that prefixes the lock barrier is omitted for simplicity.

```
// lock ownership test omitted
// memoized lock operation
ld [obj+klass_offset], tmp  // prepare for logging; prefetch obj
header // in cache; tmp holds address of first instruction of record
codelet
ld [Gthread, offset_to_cached_old_lockstate], oldls
ld [Gthread, offset_to_cached_new_lockstate], newls
cas [obj+lock_pointer_offset], oldls, newls  // oldls and newls atomic
                                             // compare and exchange
cmp olds, newls
ld [tmp+logger_offset], tmp  //assume cache hit, preload logger
be, do_logging    // branch to logging if memoized write locking
succeed
ld [Gthread, offset_to_log_tail], tail
// cache miss -- call the lock manager
call slow_get_write_lock, obj, newls
nop
// lock manager created new section in log and wrote in its header
the
// exchanged pointer (now in the cache entry for the old lock state).
// The tail of the log is now at first byte after section header.
```

-continued

```
ld [obj+klass_offset], tmp        // prepare for logging, plus prefetch
                                  // obj header in cache...
ld [Gthread, offset_to_log_tail], tail
ld [tmp+logger_offset], tmp       // assumed cache hit and preload
                                  // address of record codelet
do_logging:
jmp tmp                           // jump to leaf routine performing the logging
st obj, [tail+0]                  // begin writing log record in delay slot. Logger
code
                                  // handles mutable field -- see logger code above.
// Returns here after logging
st tail, [Gthread, offset_to_log_tail]  // write back log tail pointer
                                        // in threaddescriptor
done:
```

Figure 4:
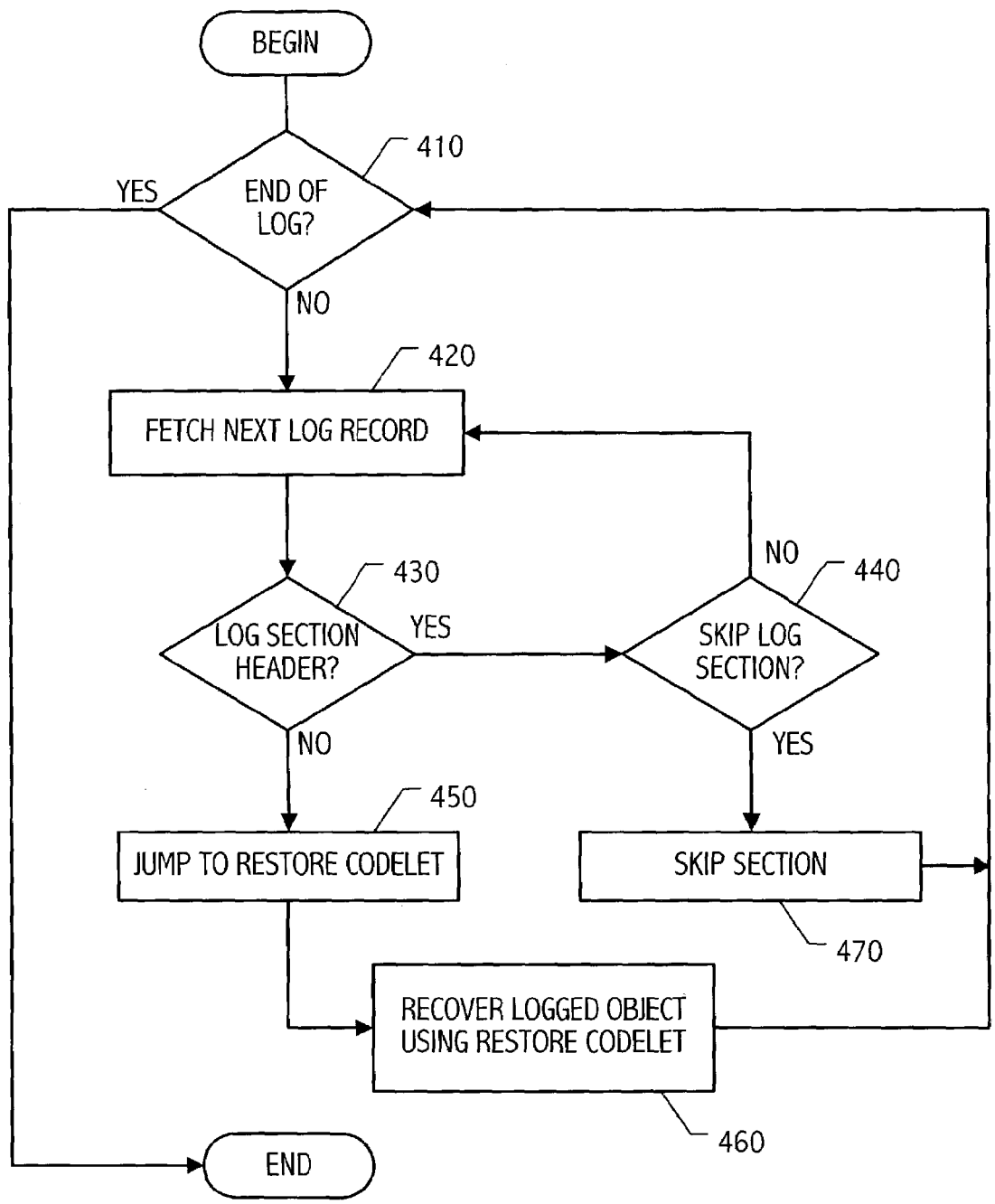
FIG. 4 is a flowchart showing an exemplary operational flow of an object update rollback process.

FIG. 4 illustrates an exemplary use of an undo log to roll back all the updates of a failed transaction. Rollback is achieved by scanning the log. Scanning the log involves maintaining a cursor (typically, a variable holding an offset from the beginning of the log). The cursor is updated both by undo codelet and the logic of transaction rollback. When the end of the log is reached (as determined by end of log decision 410), no further undo actions are taken.

If the end of the log is not reached, the next log record is analyzed. If the record denotes the head of a new section (decision 420), the roll back procedure must determine whether the whole log section must be skipped (decision 440). Skipping a section may be necessary as the log records of the section may not reflect the oldest value of logged objects in the log. This situation happens only when the log includes records delegated by other transactions. Skipping the section (skip section operation 470) is achieved by adding the size of the log section, which is recorded in the section header log record, to the undo cursor mentioned earlier.

Otherwise, if the log record contains information to undo an object, the address of the restore codelet of the logged object is retrieved and execution is transferred to the restore codelet (jump to restore codelet operation 450). The address of the restore codelet is obtained from the class of the logged object, whose address is stored in the undo log record. Before transferring to the restore codelet, the undo cursor is moved to the first logged mutable field of the undo log record.

The restore codelet recovers the state of the object by reading the logged value of mutable field off the log record and storing them back to the logged objects (operation 460). The last instruction of the restore codelet transfer control back to the roll back procedure, which loops back to determine if the end of the log is reached (decision 410). When the end of the log is reached, the rolled back transaction may release all the locks it owns.

The techniques described herein support multiple levels of undo. This means that a transaction can perform updates over another transaction's updates, as long as consistency is guaranteed by concurrency control. Some transaction models that allow some form of nesting of updates are such that a transaction T that performed nested updates delegates (see, e.g., FIG. 2, operation 260) its updates to another transaction Td such that: transaction Td is one of the transactions that allowed transaction T to perform the conflicting updates in the first place; transaction Td will eventually delegate its updates (including those T has delegated to it) to a transaction that allowed T to perform the conflict updates; and/or, transaction Td will eventually be delegated the updates of all the transactions that allowed T to perform conflicting updates with them.

Embodiments employing the above rules, along with appropriate abort dependencies, help to ensure that undoability of updates is achievable and the exemplary implementations described herein generally assume that such guarantees are enforced. The exemplary implementations also assume that failures, and therefore, undo operations to recover from them, are rare, and favors minimizing the per-object space overhead and logging time and keeping log maintenance simple over the complexity and costs of undo operations. They use lock value sharing as the method for locking for performance reasons. As previously noted, however, the exemplary implementations described herein are meant to be illustrative and, based thereon, suitable variations will be appreciated by persons of ordinary skill in the art.

Figure 5:
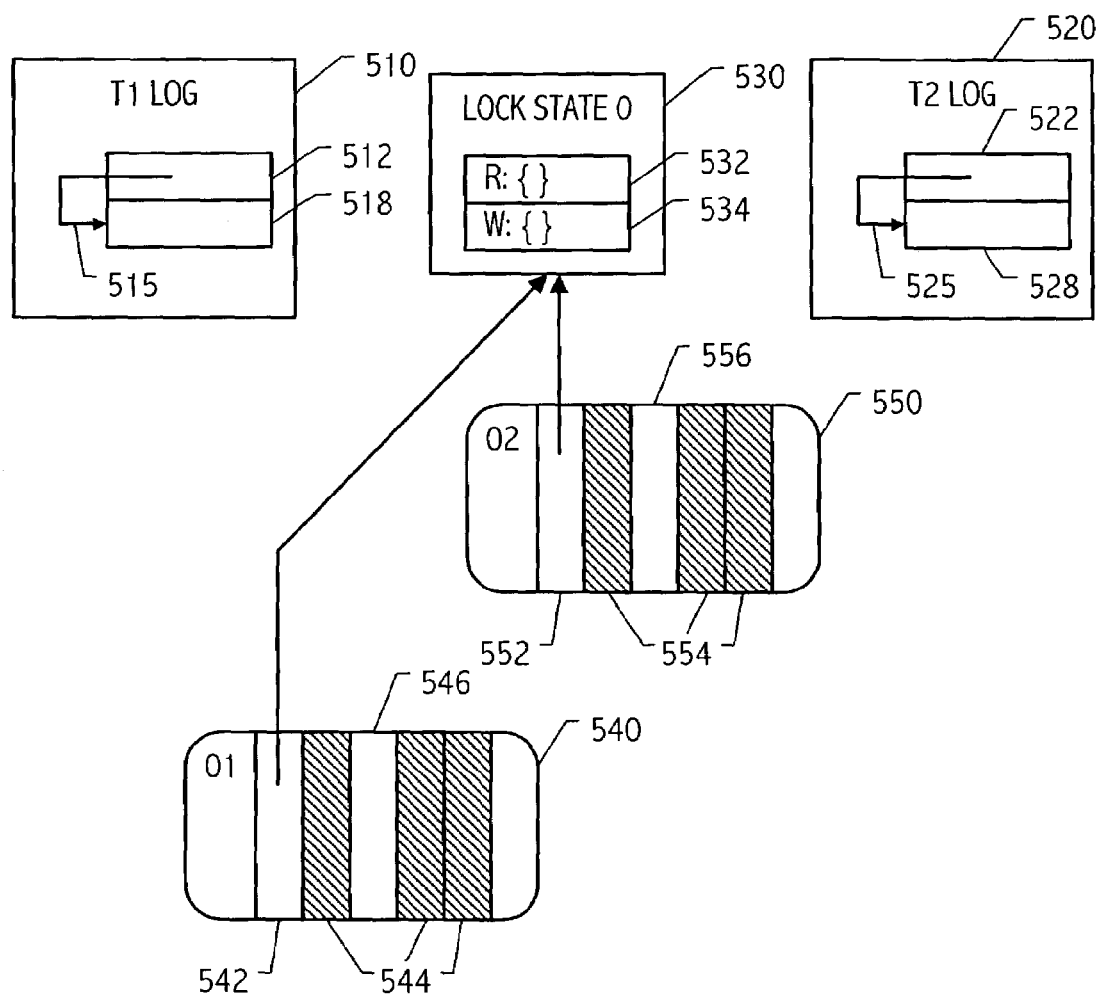
FIG. 5 is a diagram showing an exemplary set of objects and transactions configured to provide undoable updates and delegation, wherein objects are associated with lock states representing the current value of their locks, and wherein each transaction is associated with an undo log.

FIG. 5 shows an initial system state in which objects O1 and O2, designated 540 and 550, respectively, are initially unlocked and have no uncommitted updates. Object O1 540 includes a lock state pointer 542, mutable fields 544 and immutable field(s) 546. Object O2 550 includes a lock state pointer 552, mutable fields 554 and immutable field(s) 556. Because each of objects O1 and O2 are unlocked, the lock state pointer of each (pointer 542 for object O1, and pointer 552 for object O2) are pointing to the same lock state L0 530 which indicates the objects are unlocked because it includes no owners in the read set R 532 and the write set W 534. The mutable fields of each object are in an initial state since they have not yet been modified by a transaction.

FIG. 5 also shows logs 510 and 520 for each of transactions T1 and T2. As illustrated, the log of each of transactions T1 and T2 is empty of undo log information since neither of transactions T1 or T2 has updated any objects. Transaction T1 log 510 includes a header entry 512 with a pointer 515 to the tail or end entry 518 of log 510. Transaction T2 log 520 includes a header entry 522 with a pointer 525 to the tail or end entry 528 of the log 520.

Figure 6:
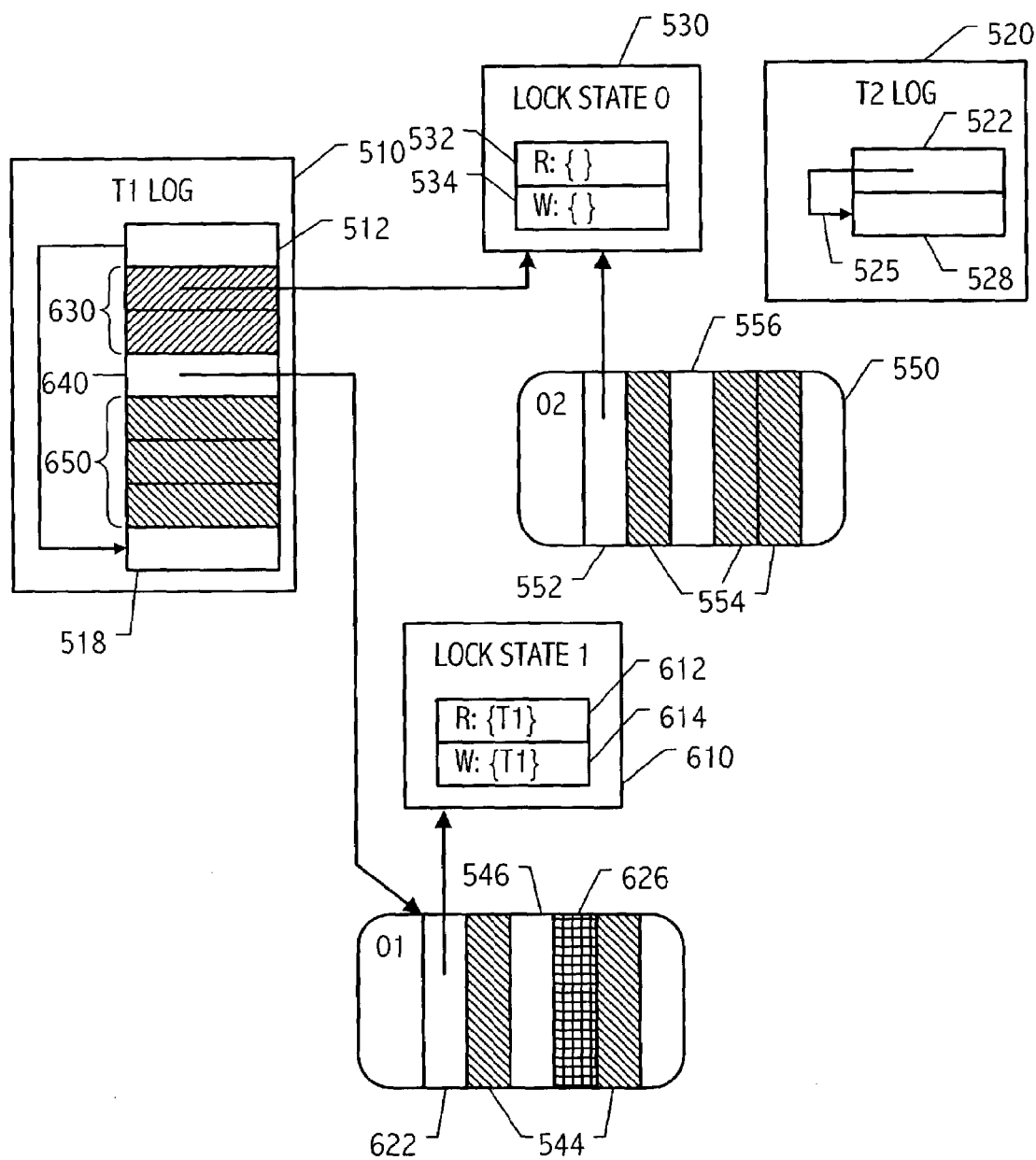
FIG. 6 is a diagram showing the exemplary set of objects of FIG. 5 after an update by a transaction of an object.

FIG. 6 shows a system state following that of FIG. 5 in which object O1 has been locked and updated by transaction T1. Because object O2 is still unlocked, its lock state pointer 552 still points to lock state L0, and its mutable fields remain unchanged from FIG. 5. Because transaction T2 has not locked or updated an object, it's log 520 remains unchanged from FIG. 5 as well. Upon the first update to object O1 by transaction T1, transaction T1 acquires object O1's lock in write mode. Because T1's log was empty, a new log section is created first by appending a log section header to T1's log. The log section header includes the value of O1's lock before its acquisition in write mode by transaction T1. Transaction T1 then appends to its log an undo record for O1. The record contains a pointer to O1, and a copy of the mutable fields of O1, prior to any updates by T1.

In one embodiment, lock management implements lock value sharing. As a result, the value of O1's lock before its acquisition in write mode by transaction T1 is represented by a pointer to lock state L0. As illustrated, T1's log 510 has been modified to include a pointer to lock state L0 in the log section header, at entries 630. As discussed, T1's log 510 also includes the value of the mutable fields 544 from FIG. 5 which have been copied to entries 650, and a pointer to object O1 at entry 640. Thus, T1's log 510 is a contiguous memory region that contains, in order, log header 512, log section header 630, object pointer 640, value of mutable fields 650, and tail 518.

The new value of the lock of object O1 is indicated by pointer 622 to the new lock state L1 610. Lock state L1 610 includes read owner set R:{T1} 612 and write owner set W:{T1} 614. Once it has acquired O1's lock in write mode, T1 has updated O1 as shown by modified mutable field 626. Thus, object O1 includes lock state pointer 622, immutable field 546, unchanged mutable fields 544 and newly changed mutable field 626.

Figure 7:
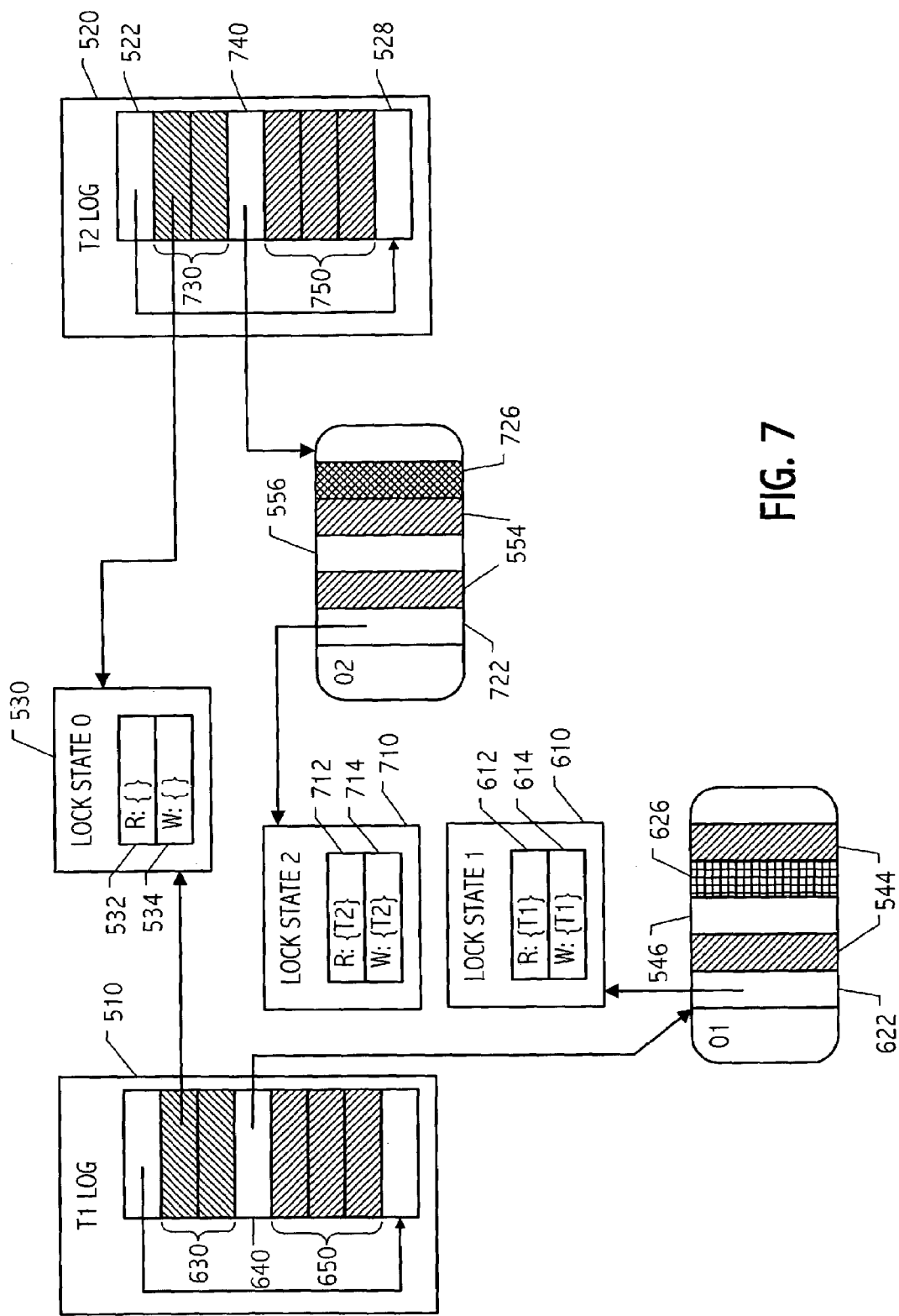
FIG. 7 is a diagram showing the exemplary set of objects of FIG. 6 after an update by another transaction of another object.

FIG. 7 shows a system state following that of FIG. 6 in which object O2 has been locked and updated by transaction T2. Because object O1 is still locked by transaction T1, it's lock state pointer 622 still points to lock state L1, and its mutable fields remain unchanged from FIG. 6. Because transaction T1 has not further locked or updated any objects, it's log 510 remains unchanged from FIG. 6 as well. Upon the first update to object O2 by transaction T2, transaction T2 acquires object O2's lock, and adds in its log the current values of the mutable fields of object O2, as well as the old value of object O2's lock and a pointer to object O1.

In one embodiment, lock management implements lock value sharing. As a result, the value of O2's lock before its acquisition in write mode by transaction T1 is represented by a pointer to lock state L0. As illustrated, T2's log 520 has been modified to include a pointer lock state L0 in the log section header, at entries 730. As discussed, T2's log 520 also includes the value of the mutable fields 554 from FIG. 6 which have been copied to entries 750, and a pointer to object O2 at entry 740. Thus, T2's log 520 is a contiguous memory region that contains, in order, log header 522, log section header 730, object pointer 740, value of mutable fields 750, and tail 528.

The new value of the lock of object O2 is indicated by pointer 722 to the new lock state L2 710. Lock state L2 710 includes read owner set R:{T2} 712 and write owner set W:{T2} 714. After the lock on object O2 was obtained by transaction T2, object O2 was updated by transaction T2 (or a thread thereof) as shown by modified mutable field 726. Once it has acquired O2's lock in write mode, transaction T2 has updated O2 as shown by modified mutable field 726. Thus, object O2 includes lock state pointer 722, immutable field 556, unchanged mutable fields 554 and newly changed mutable field 726.

Figure 8:
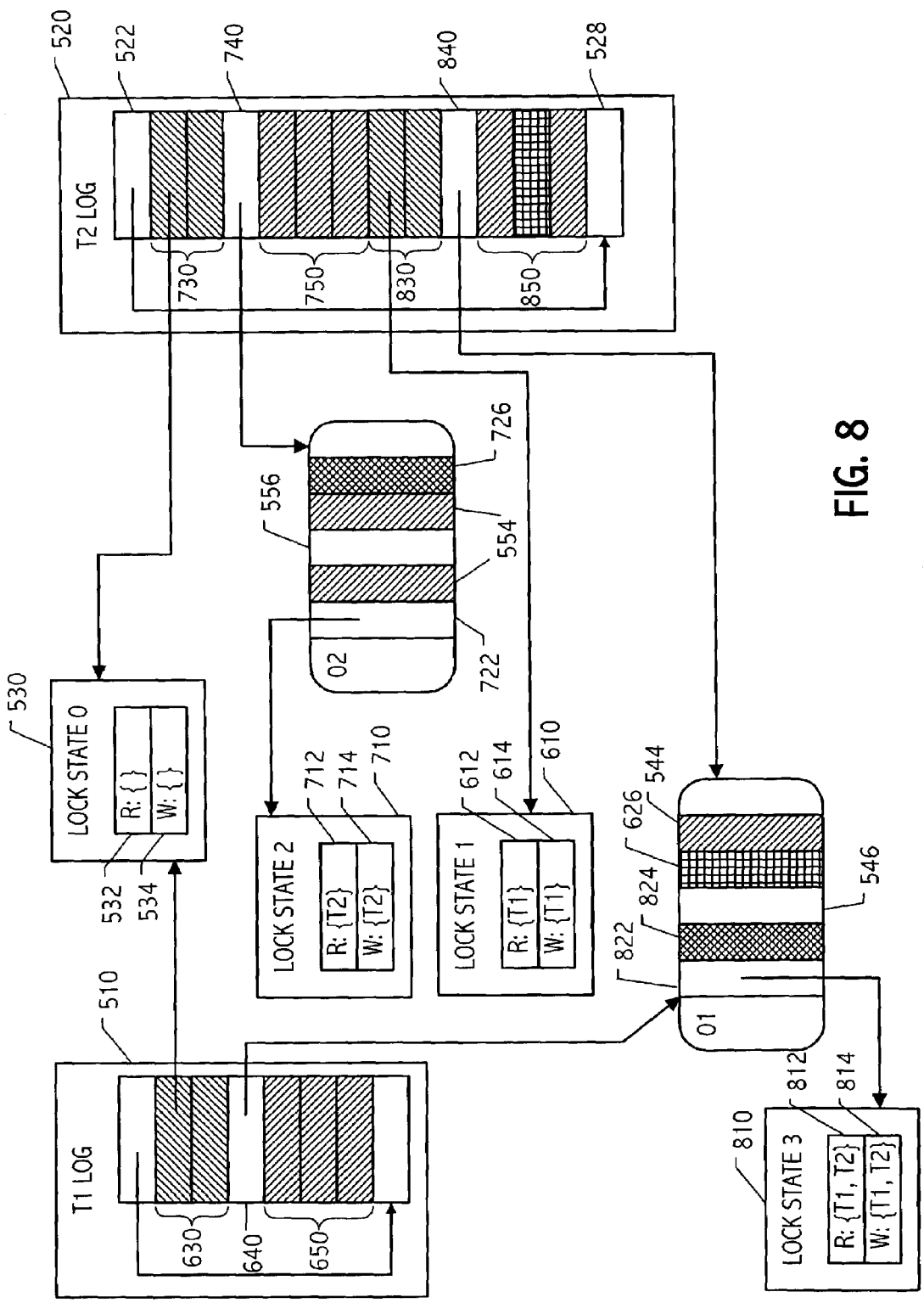
FIG. 8 is a diagram showing the exemplary set of objects of FIG. 7 after a further update by the other transaction of an object.

FIG. 8 shows a system state following that of FIG. 7 in which object O1 has been locked and updated by transaction T2. Because no further locking or updating of object O2 has occurred from FIG. 7 to FIG. 8, and because no further locking or updating has been performed by transaction T1, object O2 and T1 log 510 remain unchanged from FIG. 7. Upon the update to object O1 by transaction T2, transaction T2 acquires object O1's lock, and adds in its log the current values of the mutable fields of object O1, as well as the old value of object O1's lock and a pointer to object O1.

In one embodiment, the value of O1's prior lock is actually provided via a pointer to the lock state that represented the unlocked state, in this case L1. As illustrated, T2 log 520 has been modified to include O1's prior lock state information at log entries 830. Thus, T2 log 520 now includes information indicative of the former lock state owner sets 612, 614 from lock state L1 at log entries 830, which entries 830 are appended after entries 750 in the illustrated embodiment. The former lock state owner sets 612, 614 indicate the lock state L1 of object O1 by transaction T1 prior to being locked by transaction T2. T2 Log 520 also includes a pointer to object O1 at log entry 840 and the mutable fields 544 and 626 (with values as initially illustrated in FIG. 7) which have been copied to T2 log entries 850. Thus, the memory region of T2 log 520 now includes header 522, lock state L0 indicator entries 730, object O2 pointer 740, object O2 mutable field information 750, log section header entries 830, object O1 pointer 840, object O1 mutable field information 850, and tail 528.

The new value of the lock of object O1 is indicated by pointer 822 to the new lock state L3 810. Lock state L3 810 includes read owner set R:{T1, T2} 812 and write owner set W:{T1, T2} 814. Once it has acquired O1's lock in write mode, T2 has updated O1 as shown by modified mutable field 824. Thus, object 01 now includes lock state pointer 822, immutable field 546, unchanged mutable field 544 and changed mutable fields 626 and 824 (changed by transactions T1 and T2, respectively).

Figure 9:
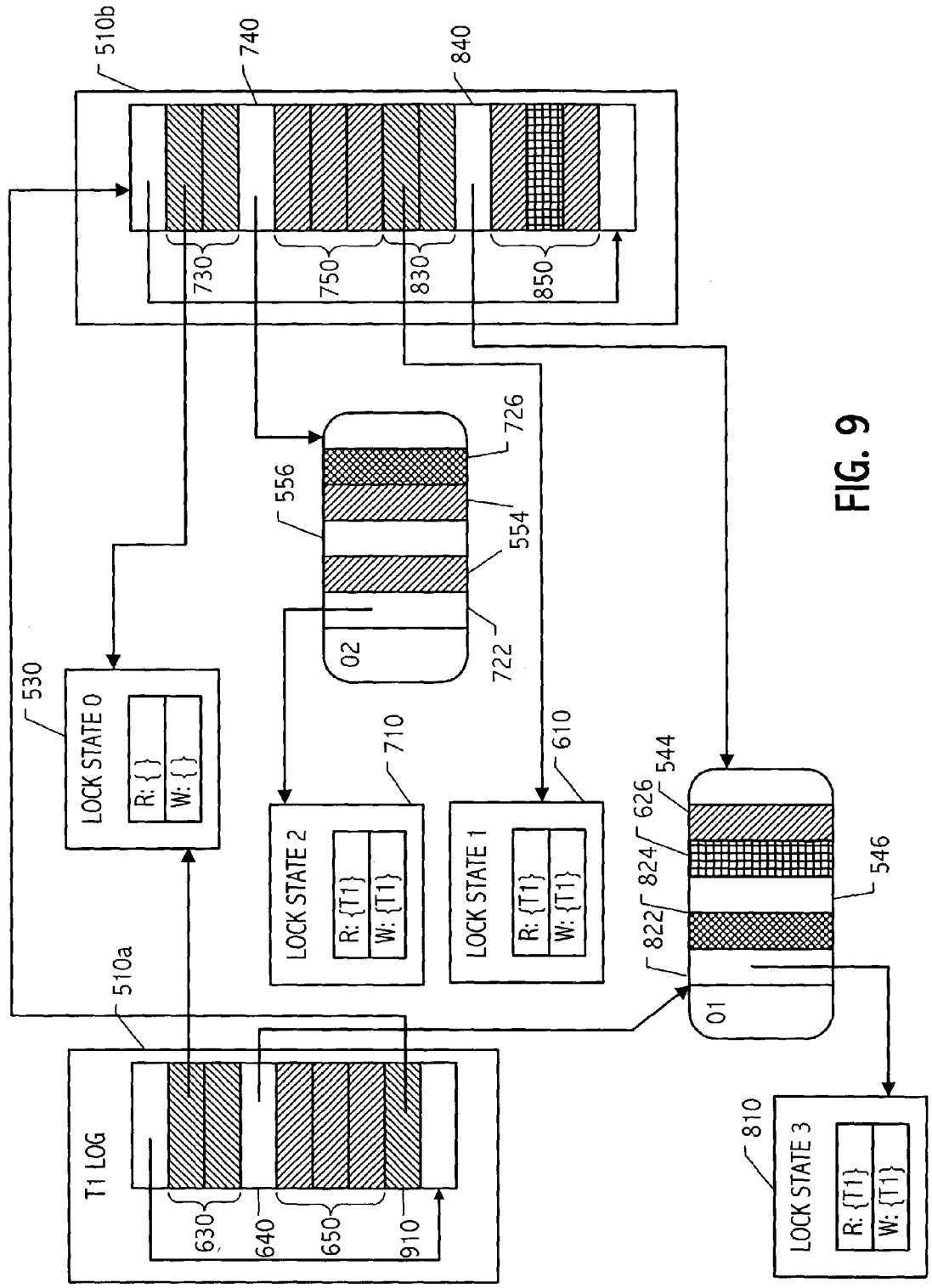
FIG. 9 is a diagram showing the exemplary set of objects of FIG. 8 after a delegation by one transaction to another.

Referring to FIG. 9, a transaction can delegate all its locks and updates to another transaction to transfer ownership of the objects it has operated on. Delegation of updates in this case is simply achieved by adding the delegated log segments to the set of log segments of the delegatee.

FIG. 9 shows a system state following that of FIG. 8 in which transaction T2 has delegated its updates to transaction T1. The log segment for T2 is added to the set of log segments of T1, and the value of O1's lock is modified to reflect the delegation (under lock value sharing, bulk delegation updates in-place the lock states representing locks of the delegating transaction). Writes from T1 subsequent to the delegations do no result in a write lock acquisition (since T1 already owns the lock in write mode by virtue of delegation), and therefore do no generate a log record. Such a log record is indeed unnecessary since T1's undo log already contains the undo log record for the update that was delegated to it.

As shown in FIG. 9, after T2 delegates to T1, T1's log 510a includes a pointer 910 to the head of log segment 510b (formerly, T2 log 520). Also, lock state L3 810 is changed to show only transaction T1 as sole owner of the lock in both read and write mode (e.g., lock state L3 includes read owner set 812 R:{T1} and write owner set 814 W:{T1}). Subsequent garbage collection will be able to reclaim the lock states L2 and L3 since they replicate L1.

Delegation of updates may result in multiple undo log records for the same object in a log. When rolling back the changes of a transaction's log, care must be taken to restore only the oldest image recorded in a log. Traditional implementation of log-based recovery system guarantees this by imposing a strict order to the records of a log, so that the oldest image is restored last. Imposing this order has a cost that may be too prohibitive for memory-resident systems. In particular, it requires synchronizing all threads to either append their log record in a single monotonic log, or to mark each log record with a unique timestamp. In various embodiments described herein, such imposed ordering may be avoided. Instead, these embodiments rely on easily identifying the oldest log record in a log, so that other can be ignored when met during rollback.

A log cleaner can take advantage of the above facilities to identify undo log records rendered useless as a result of delegations. Such records both waste space in the log and may cause garbage to be retained unnecessarily. Object pointers from such log record can be zeroed in order to relieve the garbage collected heap. Going further, a log segment containing many such log records can also be compacted.

The purpose of recording in the log the value of the lock of an object before its acquisition in write mode by the transaction that update the object is to facilitate the identification of the oldest log record of an object in a log. If the write owner set of a lock state referenced from a undo log record for an object O in the log of a transaction T includes T, then the log record is not the oldest log record for O in that log: such undo log records correspond to an update from another transaction X that overwrote transaction T's updates and later delegated its updates to transaction T (since Transaction T is in the write owner set of the lock state representing the value of the object's lock before the update by transaction X). Only one undo log record for an object O in the log of a transaction T includes a pointer to the a lock state such that T is not in the write owner set of that lock value. When rolling back the log of a transaction T, any log records that references a lock state that includes T in its write owner set is ignored. In one embodiment, lock states are factored out in log section header. When rolling back the log of a transaction T, any section of the log whose header references a lock states that includes T in its write owner set is ignored.

Lock delegations have a side-effect of also updating the value of the lock states referenced from an undo log. This can be seen in an example of nested transactions implemented using a lock manager that implements lock value sharing and the mechanisms for undo and delegation described herein. Nested transactions allows a sub-transaction to overwrite the updates of its ancestor transactions. Upon commit, a sub-transaction delegates all of its locks to its parent transaction. If the sub-transaction fails, its updates are rolled back.

The additional examples provided below assume the following hierarchy of nested transactions: T1←T2←T3←T4, where T1 is the root of the hierarchy and T4 its leaf. To describe the scenario, we use the following notation: W(T,O) denotes a write operation by T on O. Tx→Ty denotes a bulk delegation of all the updates and locks of Tx to Ty.

Referring to Table 1 below, the first scenario illustrates the basic principles of logging, bulk delegation and rollback. Object O1 is initially unlocked and has no uncommitted updates. The log of both T1 and T2 is empty (step 1 below; also as in FIG. 5). Upon the first update to O1 by T2 (W(T2, O1) before step 2 below), T2 acquires O1's lock, and adds in its log the current values of the mutable fields of O1, as well as the old value of O1's lock (actually a pointer to the lock state that represented the unlocked state). When T2 commits (T2→T1 before step 3 below), it delegates all its locks and updates to T1 (its parent). The log segment for T2 is added to the set of log segments of T1, and the value of O1's lock is modified to reflect the delegation (under lock value sharing, bulk delegation updates in-place the lock states representing locks of the delegator). Writes from T1 (W(T1, O1) before step 4 below) subsequent to the delegations have no effect in a write lock acquisition (since T1 already owns the lock in write mode by virtue of delegation), and therefore do no generate a log record. Such a log record is indeed unnecessary since T1's undo log already contains the undo log record for the update that was delegated to it. A rollback of T1 would restore the log record for O1 delegated by T2 (since the write owner set of logged lock state for O1 does not contains T1).

TABLE 1

| Step/Operation | Write Owner Set | lock state | Logs |
| --- | --- | --- | --- |
| 1 | lock(O1) = {} = | 10 | log(T2) = [] |
| | | | log(T1) = [] |
| W (T2, O1) | lock(O1) = {T2} = | 11 | log(T2) = [O1, 10] |
| 2 | | | log(T1) = [] |

TABLE 1-continued

| Step/Operation | Write Owner Set | lock state | Logs |
|---|---|---|---|
| T2 => T1 3 | lock(O1) = {T1} = | 11 | log(T1) = [] [O1, 10] |
| W (T1, O1) 4 | lock(O1) = {T1} = | 11 | log(T1) = [] [O1, 10] |

Referring to Table 2 below, object O1 is initially unlocked and without uncommitted updates (step 1). Transaction T1 first updates O1 with operation W(T1, O1). O1's lock is now represented by a new lock state L1, and O1's mutable fields are logged with the lock state L0 in T1's log, denoted O1-0 (step 2). Next, transaction T3 updates O1 at operation W(T3, O1). L1 is added to T3's log, along with an image of the version of O1 updated by T1, denoted O1-1 (step 3). T1's log remains unchanged. Next, transaction T4 updates O1 at operation W(T4, O1). The prior lock value L2 is added to T4's log, along with an image of the version of O1 updated by T3, denoted O1-2 (step 4). Next, T4 commits and delegates it's log to T3 at operation T4→T3 after step 4, and T3 commits and delegates it's log to T2 at operation T3→T2 after step 5. At step 6, T2 has acquired O1's lock by delegation. Therefore, T2 will never acquire O1's lock explicitly (i.e., via a lock barrier), and will therefore never log an record for O1. Note that delegation also update the value of the lock state referenced from the log (for instance the value of 12 is updated at each delegation of the scenario). At step 5, if T3 rolls its updates back, it will restore O1-1 since T3 is not in the owner set of 11. The undo log record with O1-2 will be ignored since T3 is in the owner set of 12. Similarly, at step 7, if T1 rolls its updates back, it will restore O1-0 only, since it is the only record where T1 is not in the owner set of the logged lock state.

correspond to objects that all had the same lock value (e.g., the same pointer to the same lock state representing that lock value) at the time the undo log record was generated. This organization avoids to store a pointer to a lock state in every records, further reducing the space consumed by log records. Instead, the pointer to the lock state is stored in the section header. Transaction rollback navigates through each log segment of a transaction's pool section per section. All the log records of a section can be ignored if the rolled back transaction is in the write owner set of the lock state whose reference is recorded in the section's header. This is because log records in this section correspond to updates that were performed after the first update made by this transaction (since the transaction owned the log at the time the log records were generated). The header of a section contains an offset from the beginning of the segment to the next section, which allows to skip a section entirely. Each undo log record contains the address of the logged object. The class of that object, which can be obtained from the object itself, contains both the record and restore codelet. The latter can be used to restore the state of the logged object from the undo log record. The format of the log records is unique in that it does not contain anything beyond the current address of the logged object and the value of its mutable fields. In particular, the log records in the above described embodiments need not contain transaction identifier, information about the length of the record itself, or of any of the mutable field it contains, or the position of each of mutable fields in the logged object.

Thus, updates on main-memory resident objects may be undone, even for objects without a backing store or whose only image is in main memory, and even for objects accessible by concurrent transactions. One or more levels of such updates performed on a main-memory image of potentially volatile objects may be undone, for example, in a program-

TABLE 2

| Step/Op | Write Owner Set | Lock State | Logs |
|---|---|---|---|
| 1 | lock(O1) = {} = | 10 | |
| W(T1, O1) 2 | lock(O1) = {T1} = | 11 | log(T1) = [O1-0, 10] |
| W(T3, O1) 3 | lock(O1) = {T1, T3} = | 12 | log(T1) = [O1-0, 10]<br>log(T3) = [O1-1, 11] |
| W(T4, O1) 4 | lock(O1) = {T1, T3, T4} = | 13 | log(T1) = [O1-0, 10]<br>log(T3) = [O1-1, 11]<br>log(T4) = [O1=2, 12] |
| T4 => T3 5 | lock(O1) = {T1, T3} =<br>{T1, T3} =<br>{T1} =<br>{} = | 13<br>12<br>11<br>10 | log(T1) = [O1-0, 10]<br>log(T3) = [O1-1, 11] [O1-2, 12] |
| T3 => T2 6 | lock(O1) = {T1, T2} =<br>{T1, T2} =<br>{T1} =<br>{} = | 13<br>12<br>11<br>10 | log(T1) = [O1-1, 10]<br>log(T2) = [O1-1, 11] [O1-2, 12] |
| T2 => T1 7 | lock(O1) = {T1} =<br>{T1} =<br>{T1} =<br>{} = | 13<br>12<br>11<br>10 | log(T1) = [O1-0, 10] [O1-1, 11]<br>[O1-2, 12] |

In the embodiment's described above, each transaction is associated with a pool of log segments. The pool contains at least one log segment per active thread (since each thread is assigned a private log segment) as well as all the log segments that were delegated to the transaction. Bulk delegation transfers log segments of the pool of the delegating transaction to the pool of the delegatee transaction. The log is organized into sections. Undo log records in a section ming system that tightly couples a programming language with transaction processing capabilities. Language-based extensible systems may also use transaction processing capabilities to isolate applications from each other in order to safely share objects between applications, and support for multiple levels of undo and delegation of updates to enable the realization of sophisticated transaction models, such as nested transactions. Certain embodiments of the techniques can allow low per-object space overhead to support undo logging, low processing overhead to logging of undo record, elimination of log-tail bottleneck, support for one or more levels of undo, support the ability to delegate all updates of one transaction to another transaction. In some realizations, the format and/or organization of log records provides certain advantages in that they do not require recording information beyond the current address of the logged object and the value of its mutable fields. In particular, such log records do not require a transaction identifier, information about the length of the record itself, or a link to other log records. Of course, each realization need not exhibit all of the aforementioned advantages and particular realizations will be understood by persons of ordinary skill in the art in the context of the description that follows.

A goal of various embodiments described herein is to make operations associated with undoability as fast as possible, which is especially important when supporting undo in main-memory settings, such as in the runtime of programming languages. Thus, embodiments have been described which minimize the overhead associated with detecting when undo information need to be recorded in a log eliminate any inter-transaction (or inter-thread) synchronization related to undo activities, and minimize the number of instructions that must be executed to generate undo information, To minimize barrier overhead, embodiments described above record enough information upon a first update to an object, so that subsequent updates, regardless of what portion of an object they involve, do not need to record further undo information. The reason for doing so is that the first update to an object coincides with a lock acquisition, the need for which is already tested and paid for by the runtime. Hence, all mutable fields of an object are recorded upon acquisition of its lock in write mode by a transaction.

To address synchronization costs, above embodiments can ensure that every thread of execution in the system uses a private region of memory to record its undo information so that no synchronization is ever needed when recording such undo information. To this end, each transaction may manage a private pool of log segments and allocate one log segment to each of the thread that runs on its behalf.

To decrease the number of undo-related operations, each object is associated with customized code to record and restore itself, so that no meta-data needs to be interpreted to find out what field of the object need to be recorded/restored, and no meta-data need to be written onto the log. Both contribute to make recording of undo information minimally time consuming, (e.g., by reducing recording to only load and store instructions, and eliminating a need for branches, comparisons, iteration variables, and so on). Having no need to write any meta-data to the log makes log record very compact, thus reducing memory.

Accordingly, in the absence of multiple level of undo and delegations, to undo its updates, a transaction simply iterates over the log and restores the mutable fields of each logged object.

At least some of the above embodiments also support features required by advanced transaction models such as multiple levels of undo and delegation. To support multiple levels of undo requires the ability to detect a first update by a transaction to an object already updated by another uncommitted transaction. So, in above embodiments, undo information is created upon lock acquisition. This naturally detects when a second transaction performs its first update on an object already updated by another uncommitted transactions.

Delegation can be simply supported by linking logs of transactions together (i.e., the list of log segments of the delegator is appended to the list of log segments of the delegatee). Because there is no imposed order between log record, undoing may be incorrect if such is not accounted for, but imposing an order to solve the problem conflicts with the goal of minimizing overhead due to undo information recording operations. The problem is solved by recording the lock value each object has before its lock is acquired for the first time for an update. The lock value tells which transaction owned the lock at the time the log was recorded. Then to decide whether a particular record should be used to restore an object, the undoing transaction tests if it is in the owner set of that lock value. If it is, it must not used the associated undo log record.

Delegation of locks should update the lock values recorded in all undo log. Lock delegation should scan all undo locks to find lock values to update. However, if lock management implements the lock state sharing described above, such scanning is not necessary. That which is recorded in the log is a pointer to a lock state of the lock manager, which bulk lock delegation already modifies to reflect the effect of bulk lock delegation.

While the invention has been described with reference to various embodiments, it will be understood that these embodiments are illustrative and that the scope of the invention is not limited to them. Many variations, modifications, additions, and improvements are possible. More generally, realizations in accordance with the present invention have been described in the context of particular embodiments. These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A method of providing a capability of undoing an object update in a memory of an information processing system, the method comprising:

detecting a loading event for a class in the information processing system; and generating at least one class-specific codelet corresponding to the class responsive to the loading event, wherein generating the at least one class-specific codelet comprises:

generating a record codelet corresponding to the loaded class; and generating a restore codelet corresponding to the class.

2. The method of claim 1 wherein the step of generating the record codelet includes generating instructions for logging information regarding a state of an object in the class prior to the object being updated; and the step of generating the restore codelet includes generating instructions for undoing an update to an object in the class using information logged by the record codelet.

3. The method of claim 1 wherein the step of generating the record codelet comprises generating instructions for copying mutable field values of an object of the class to a log of a transaction.

4. The method of claim 3 wherein a lock barrier is initiated to copy lock state information to the log.

5. The method of claim 3 further comprising:
executing the instructions for copying mutable field values a first time a lock is acquired on the object by the transaction.

6. The method of claim 5 wherein lock state information is copied to the log prior to invoking a record codelet.

7. The method of claim 5 wherein a new log section is created in the log by copying lock state information to the log responsive to a lock acquisition.

8. The method of claim 5 wherein the lock is a write lock.

9. The method of claim 5 wherein the copied lock state information is used to identify undo log records of the log for use in restoring the object to a prior state.

10. The method of claim 3 further comprising:
scanning the log for lock state information to identify oldest log records of the log which have undo information, the scanning being performed responsive to a system event indicative of a rollback of the transaction; and
executing the restore codelet for each identified oldest log record.

11. The method of claim 10 wherein the executing the restore codelet comprises undoing the update corresponding to an oldest object state of the object by copying mutable fields of an identified log record to the object.

12. The method of claim 3 further comprising:
scanning the log; and
copying mutable field information from the log to the object if each lock state information field does not include information indicating that the transaction was a prior lock state owner.

13. The method of claim 12 further comprising: ignoring mutable field information if each lock state information field includes information indicating that the transaction was a prior lock state owner.

14. The method of claim 3 further comprising:
detecting a delegation event of the transaction to a delegatee transaction;
associating the log of the transaction to a delegatee log of a delegatee transaction; and
updating lock values of the log to reflect a change in lock values as a result of the delegation event.

15. The method of claim 1 wherein the step of generating the record codelet comprises:
generating instructions for copying mutable field values of an object of the class to a log of a transaction; and
generating instructions for copying information indicative of the object of the class to the log.

16. The method of claim 15 wherein the information indicative of the object uniquely identifies the object.

17. The method of claim 15 wherein the information indicative of the object is an object pointer.

18. The method of claim 15 wherein the instructions for copying the mutable field information are executed responsive to an acquisition of a lock of the object by the transaction.

19. The method of claim 18 wherein the lock of the object is a write mode lock.

20. The method of claim 15 wherein the step of generating the record codelet further comprises generating instructions for copying prior lock state information of the object to the log, wherein the prior lock state information is stored for use in undoing any updates performed by the transaction pursuant to a new lock obtained by the transaction.

21. A method of recording information to undo resource updates, the method comprising:
copying mutable field values of an object to a log corresponding to a transaction; and
copying prior lock state information regarding the object of the class to the log, the prior lock state information indicative of a lock of the object prior to a new lock of the object by the transaction.

22. The method of claim 21 wherein all mutable field values are copied to the log.

23. The method of claim 22 wherein the lock is an update mode lock.

24. The method of claim 22 wherein the copied prior lock state information identifies a transaction owner of a prior lock on the object prior to the acquisition of the lock by the transaction.

25. The method of claim 21 further comprising: performing the copying of the mutable field values and the prior lock state information a first time a lock is acquired in an update mode.

26. The method of claim 21 further comprising:
detecting a rollback event of the transaction; and
undoing updates to objects performed by the transaction using information from the log.

27. The method of claim 26 wherein the step of undoing the updates is performed using lock state information to determine an oldest object state without regard to an order in which undo log records including the mutable field information is stored in the log.

28. The method of claim 26 wherein the step of undoing the updates comprises:
scanning the log for lock state information; and
copying mutable field information from the log to the object if each lock state information does not include information indicating that the transaction is an owner of a lock state in any update mode.

29. The method of claim 28 wherein the step of undoing the updates comprises:
ignoring mutable field information if each lock state information field includes information indicating that the transaction was a prior lock state owner.

30. The method of claim 21 further comprising:
updating lock values stored in the log upon a delegation by the transaction to another transaction.

31. An apparatus comprising:
means for copying all mutable field values of an object to a log corresponding to a transaction; and
means for copying prior lock state information regarding the object to the log, the prior lock state information indicative of a lock of the object prior to a new lock of the object by the transaction.

32. The apparatus of claim 31 further comprising:
means for performing the copying of the mutable field values and the prior lock state information a first time a lock is acquired on the object by each of a plurality of transactions.

33. The apparatus of claim 31 further comprising:
means for detecting a rollback event of the transaction;
means for undoing updates to objects performed by the transaction using information from the log.

34. The apparatus of claim 33 wherein the code for undoing the updates includes instructions for using the lock state information to determine an oldest object state without regard to an order in which the mutable field information is stored in the log.

35. The apparatus of claim 33 wherein the means for undoing the updates comprises:
means for scanning the log for lock state information; and
means for copying mutable field information from the log to the object if the lock state information does not indicate that transaction ownership of the lock whose value is represented by the lock state information.

36. The apparatus of claim 31 further comprising:
a virtual machine, the virtual machine including the means for copying the mutable field values and the means for copying the prior lock state information.

37. The apparatus of claim 36 wherein the virtual machine further comprises:
means for generating a record codelet corresponding to a class of the object, the record codelet including the means for copying; and means for generating a restore codelet corresponding to the class.

38. The apparatus of claim 31 further comprising:
a processor and a memory coupled to the processor, the memory including the means for copying the mutable field values and the means for copying the prior lock state information.

39. The apparatus of claim 31 further comprising:
means for updating lock values stored in the log upon a delegation by the transaction to another transaction.

40. A computer readable medium containing instructions for undoing an object update in a memory of an information processing system, the instructions comprising functionality to:
detect a loading event for a class in the information processing system; and
generate at least one class-specific codelet corresponding to the class responsive to the loading event by generating a record codelet corresponding to the loaded class and generating a restore codelet corresponding to the class.

41. The computer readable medium of claim 40, wherein generating the record codelet comprises:
generating instructions for copying mutable field values of an object of the class to a log of a transaction.

42. The computer readable medium of claim 41, the instructions further comprising functionality to:
initiate execution of a system module to copy lock state information to the log the first time a lock is acquired in an update mode.

43. The computer readable medium of claim 41, the instructions further comprising functionality to:
initiate a scan of the log responsive to detecting a rollback event of the transaction, the scan for scanning the log for lock state information to identified oldest log records of the log which have undo information; and
initiate execution of the restore codelet for each identified oldest log record to undo updates to objects performed by the transaction using information from the log.

44. The computer readable medium of claim 43, wherein the instructions for generating the restore codelet comprise functionality to:
generate instructions in the restore codelet for scanning the log for lock state information; and
generate instructions in the restore codelet for copying mutable field information from the log to the object if the lock state information does not include information that the transaction is an owner of a lock state in any update mode.

45. The computer readable medium of claim 41, wherein generating the restore codelet comprises:
generating instructions in the restore codelet for undoing the oldest updates to the object.

46. The computer readable medium of claim 45, the instructions further comprising functionality to:
generate instructions in the restore codelet for identifying the oldest undo log records in the log using lock state information for each object with undo information recorded in the log; and
selectively invoke the restore codelet to undo the oldest undo log records.

47. The computer readable medium of claim 41, the instructions further comprising functionality to:
update lock values stored in the log upon a delegation by the transaction to another transaction.

* * * * *